United States Patent
Qiu et al.

(10) Patent No.: US 8,620,257 B2
(45) Date of Patent: Dec. 31, 2013

(54) SYSTEMS AND METHODS FOR LOCATION MANAGEMENT AND EMERGENCY SUPPORT FOR A VOICE OVER INTERNET PROTOCOL DEVICE

(75) Inventors: Chaoxin Charles Qiu, Austin, TX (US); Richard L. Khan, San Ramon, CA (US); Robert F. Dailey, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1652 days.

(21) Appl. No.: 11/676,877

(22) Filed: Feb. 20, 2007

(65) Prior Publication Data

US 2008/0200143 A1    Aug. 21, 2008

(51) Int. Cl.
*H04M 11/04* (2006.01)

(52) U.S. Cl.
USPC ............ 455/404.2; 455/404.1; 455/456.1; 455/456.3; 379/45; 379/88.17; 379/88.25; 379/207.12; 709/217; 709/218; 709/219; 709/227; 709/228; 709/229

(58) Field of Classification Search
USPC ............ 455/404.2, 404.1, 456.1, 456.3; 379/88.17, 88.25, 207.12, 45; 370/351, 370/352, 353, 356
See application file for complete search history.

(56) References Cited

U.S. PATENT DOCUMENTS

| | | | |
|---|---|---|---|
| 5,161,180 A | 11/1992 | Chavous | |
| 5,235,630 A | 8/1993 | Moody et al. | |
| 5,347,568 A | 9/1994 | Moody et al. | |
| 5,479,482 A | 12/1995 | Grimes | |
| 6,415,019 B1 | 7/2002 | Savaglio et al. | |
| 6,421,009 B2 | 7/2002 | Suprunov | |
| 6,650,901 B1 | 11/2003 | Schuster et al. | |
| 6,678,357 B2 | 1/2004 | Stumer et al. | |
| 6,707,888 B1 | 3/2004 | Cope | |
| 6,771,742 B2 | 8/2004 | Mathis et al. | |
| 6,799,049 B1 | 9/2004 | Zellner et al. | |
| 6,807,483 B1 * | 10/2004 | Chao et al. | 701/210 |
| 6,927,727 B2 | 8/2005 | Cleghorn | |
| 6,940,950 B2 | 9/2005 | Dickinson et al. | |

(Continued)

FOREIGN PATENT DOCUMENTS

| EP | 1337089 A2 | 8/2003 |
|---|---|---|
| EP | 1337089 A3 | 3/2004 |

(Continued)

OTHER PUBLICATIONS

International Searching Authority, Invitation to Pay Additional Fees and Partial International Search for International application No. PCT/US2008/051141, Jan. 27, 2009, 5 pages.

(Continued)

*Primary Examiner* — Olumide T Ajibade Akonai
(74) *Attorney, Agent, or Firm* — Hanley, Flight and Zimmerman, LLC

(57) ABSTRACT

Example systems and methods to manage location information for emergency services support of an internet protocol ("IP") communication device are disclosed. A disclosed example method involves storing first and second geographic location information in a first list of geographic location information associated with an internet protocol device. The first list is stored at a service provider server. At least a partial copy of the first list is communicated from the service provider server to the internet protocol device for storing as a second list of geographic location information in the internet protocol device.

20 Claims, 17 Drawing Sheets

(56) References Cited

U.S. PATENT DOCUMENTS

| | | | |
|---|---|---|---|
| 7,027,564 B2 | 4/2006 | James | |
| 7,042,985 B1 | 5/2006 | Wright | |
| 7,079,627 B2 | 7/2006 | Crago et al. | |
| 7,103,034 B1 | 9/2006 | Srinivas et al. | |
| 7,130,385 B1 | 10/2006 | Moon | |
| 7,260,186 B2 | 8/2007 | Zhu et al. | |
| 7,480,933 B2 | 1/2009 | Bush et al. | |
| 7,639,792 B2 | 12/2009 | Qiu et al. | |
| 7,773,975 B2 | 8/2010 | Snapp et al. | |
| 8,027,333 B2 * | 9/2011 | Grabelsky et al. | 370/352 |
| 8,064,875 B2 * | 11/2011 | Velazquez et al. | 455/404.2 |
| 8,189,568 B2 | 5/2012 | Qiu et al. | |
| 2001/0022558 A1 | 9/2001 | Karr, Jr. et al. | |
| 2003/0146871 A1 | 8/2003 | Karr et al. | |
| 2003/0217122 A1 | 11/2003 | Roese et al. | |
| 2003/0222819 A1 | 12/2003 | Karr et al. | |
| 2003/0222820 A1 | 12/2003 | Karr et al. | |
| 2004/0057425 A1 | 3/2004 | Brouwer et al. | |
| 2004/0125923 A1 * | 7/2004 | See et al. | 379/88.17 |
| 2004/0151283 A1 | 8/2004 | Lazoff | |
| 2004/0198386 A1 | 10/2004 | Dupray | |
| 2004/0266457 A1 | 12/2004 | Dupray | |
| 2005/0026650 A1 | 2/2005 | Russell | |
| 2005/0063519 A1 | 3/2005 | James | |
| 2005/0074008 A1 | 4/2005 | Herledan et al. | |
| 2005/0083911 A1 * | 4/2005 | Grabelsky et al. | 370/352 |
| 2005/0090225 A1 | 4/2005 | Muehleisen et al. | |
| 2005/0135569 A1 | 6/2005 | Dickinson et al. | |
| 2005/0141431 A1 | 6/2005 | Caveney et al. | |
| 2005/0153681 A1 | 7/2005 | Hanson | |
| 2005/0175166 A1 | 8/2005 | Welenson et al. | |
| 2005/0190892 A1 | 9/2005 | Dawson et al. | |
| 2005/0213716 A1 * | 9/2005 | Zhu et al. | 379/45 |
| 2005/0232164 A1 | 10/2005 | Anzarouth et al. | |
| 2005/0265326 A1 | 12/2005 | Laliberte | |
| 2006/0039539 A1 | 2/2006 | Goldman et al. | |
| 2006/0056388 A1 * | 3/2006 | Livingood | 370/352 |
| 2006/0068753 A1 | 3/2006 | Karpen et al. | |
| 2006/0120517 A1 | 6/2006 | Moon et al. | |
| 2006/0133354 A1 | 6/2006 | Lee | |
| 2006/0201622 A1 | 9/2006 | Sehr et al. | |
| 2007/0058615 A1 | 3/2007 | Hasenfang et al. | |
| 2007/0104183 A1 | 5/2007 | Bakke et al. | |
| 2007/0115935 A1 | 5/2007 | Qiu et al. | |
| 2007/0127452 A1 | 6/2007 | Croy | |
| 2007/0147345 A1 * | 6/2007 | Lowmaster | 370/352 |
| 2007/0189469 A1 * | 8/2007 | Croak et al. | 379/45 |
| 2007/0201622 A1 | 8/2007 | Croak et al. | |
| 2007/0230440 A1 | 10/2007 | Joong et al. | |
| 2007/0280213 A1 * | 12/2007 | Sindhwani et al. | 370/356 |
| 2008/0008179 A1 | 1/2008 | Chen et al. | |
| 2008/0101552 A1 | 5/2008 | Khan et al. | |
| 2008/0125077 A1 | 5/2008 | Velazquez et al. | |
| 2008/0276305 A1 | 11/2008 | Chan et al. | |
| 2008/0285544 A1 * | 11/2008 | Qiu et al. | 370/352 |
| 2009/0003312 A1 * | 1/2009 | Velazquez et al. | 370/352 |

FOREIGN PATENT DOCUMENTS

| | | |
|---|---|---|
| EP | 1589721 A | 10/2005 |
| WO | 2005104518 | 11/2005 |
| WO | 2006023190 | 3/2006 |
| WO | WO 2007056186 | 5/2007 |

OTHER PUBLICATIONS

Patent Cooperation Treaty, "International Search Report," issued by the International Searching Authority in connection with related PCT application No. PCT/US2008/051141, mailed Mar. 27, 2009 (6 pages).

Patent Cooperation Treaty, "Written Opinion of the International Searching Authority," issued by the International Searching Authority in connection with related PCT application No. PCT/US2008/051141, mailed Mar. 27, 2009 (11 pages).

"Interim VoIP Architecture for Enhanced 9-1-1 Services (i2)," National Emergency Number Association (NENA) Technical Committee Chairs, Issue 1 DRAFT, Aug. 5, 2005 (192 pages).

"AT&T Business Service Guide: AT&T Business Voice over IP (BVoIP) Services," AT&T, Sep. 22, 2006 (40 pages).

Frost & Sullivan, "U.S. E9-1-1 Market Insight, 6847-63," www.frost.com, 2003 (61 pages).

International Bureau, "International Preliminary Report on Patentability," issued in connection with PCT application Serial No. PCT/US2008/051141, issued Aug. 26, 2009 (13 pages).

E. Gabber et al., "On Location-Restricted Services", IEEE Network, Nov./Dec. 1999, pp. 44-52.

Akundi et al., "i2 Solution Overview," Nortel Networks, Mar. 2005 (15 pages).

Cauley, "AT&T solves VoIP's 911 issue," USA Today, Oct. 10, 2005 (2 pages). Retrieved at http://www.usatoday.com/tech/news/techinnovations/2005-10-10-voip-att_x.htm.

"CCS/SS7 Generic Requirements in Support of E9-1-1 Service," Telecordia, Dec. 2002 (3 pages). Retrieved at http://telecom-info.telcordia.com/site-cgi/ido/docs.cgi?ID=SEARCH&DOCUMENT=GR-2956&.

"CCS/SS7 Generic Requirements in Support of E9-1-1 Service Contents," GR-2956-Core, Dec. 2002 (3 pages).

Rosenberg et al., "SIP: Session Initiation Protocol," Network Working Group, RFC 3261, Jun. 2002 (232 pages).

Rosenberg et al., "Reliability of Provisional Responses in the Session Initiation Protocol (SIP)," RFC 3262, Network Working Group, Jun. 2002 (14 pages).

Rosenberg et al., "Session Initiation Protocol (SIP): Locating SIP Servers," Network Working Group, RFC 3263, Jun. 2002 (15 pages).

Rosenberg et al., "An Offer/Answer Model with the Session Description Protocol (SDP)," Network Working Group, RFC 3264, Jun. 2002 (22 pages).

* cited by examiner

SYSTEMS AND METHODS FOR LOCATION MANAGEMENT AND EMERGENCY SUPPORT FOR A VOICE OVER INTERNET PROTOCOL DEVICE

FIELD OF THE DISCLOSURE

The present disclosure relates generally to communication systems and, more particularly, to systems and methods for location management and emergency support for a voice over internet protocol device.

BACKGROUND

Internet protocol-enabled telecommunication providers in the United States are required by the Federal Communications Commission ("FCC") to support enhanced 911 ("E911") emergency call services. That is, when a telephone user dials 9-1-1, the telecommunication carrier must be able to process the call to determine the geographic location from where the call is originated to enable dispatching emergency personnel to the location of the 911 caller. Enhanced 911 service differs from traditional (non-enhanced) 911 service in that E911 service routes an emergency call to a 911 dispatcher and provides the dispatcher with the geographic location (e.g., street address) from which the call originated, while traditional 911 service routes an emergency call to a 911 dispatcher without providing the dispatcher with geographic location information indicating where the call originated.

In traditional public switched telephony networks ("PSTN"), the geographic information retrieval support for E911 is implemented by fixing associations between wireline telephone numbers and geographic street addresses. Telecommunication providers usually store a subscriber's location (e.g., a street address) in a database associated with an assigned telephone number (e.g., a call back number ("CBN")) during the service activation. When a PSTN user makes a 911 call, the calling telephone number (i.e., the CBN) of the incoming 911 call can be used to look up the geographic location of the caller, and the retrieved location information can be used to dispatch emergency personnel to the caller.

The introduction of voice over IP ("VoIP") technology introduces various challenges to service providers seeking to support E911 services. In particular, under a nomadic service (i.e., a service allowing subscribers to connect VoIP telephones at various network locations), a VoIP subscriber can easily disconnect a VoIP telephone from one location (e.g., the subscriber's home or workplace), connect the VoIP telephone in another location (e.g., a visited local area network ("LAN"), a coffee shop, a vacation spot, etc.), and register the VoIP telephone with the VoIP service provider to place telephone calls from the other location. This nomadic capability of VoIP phones introduces the potential for inaccurate associations between telephone numbers and physical or geographic locations.

DETAILED DESCRIPTION

Figure 1:
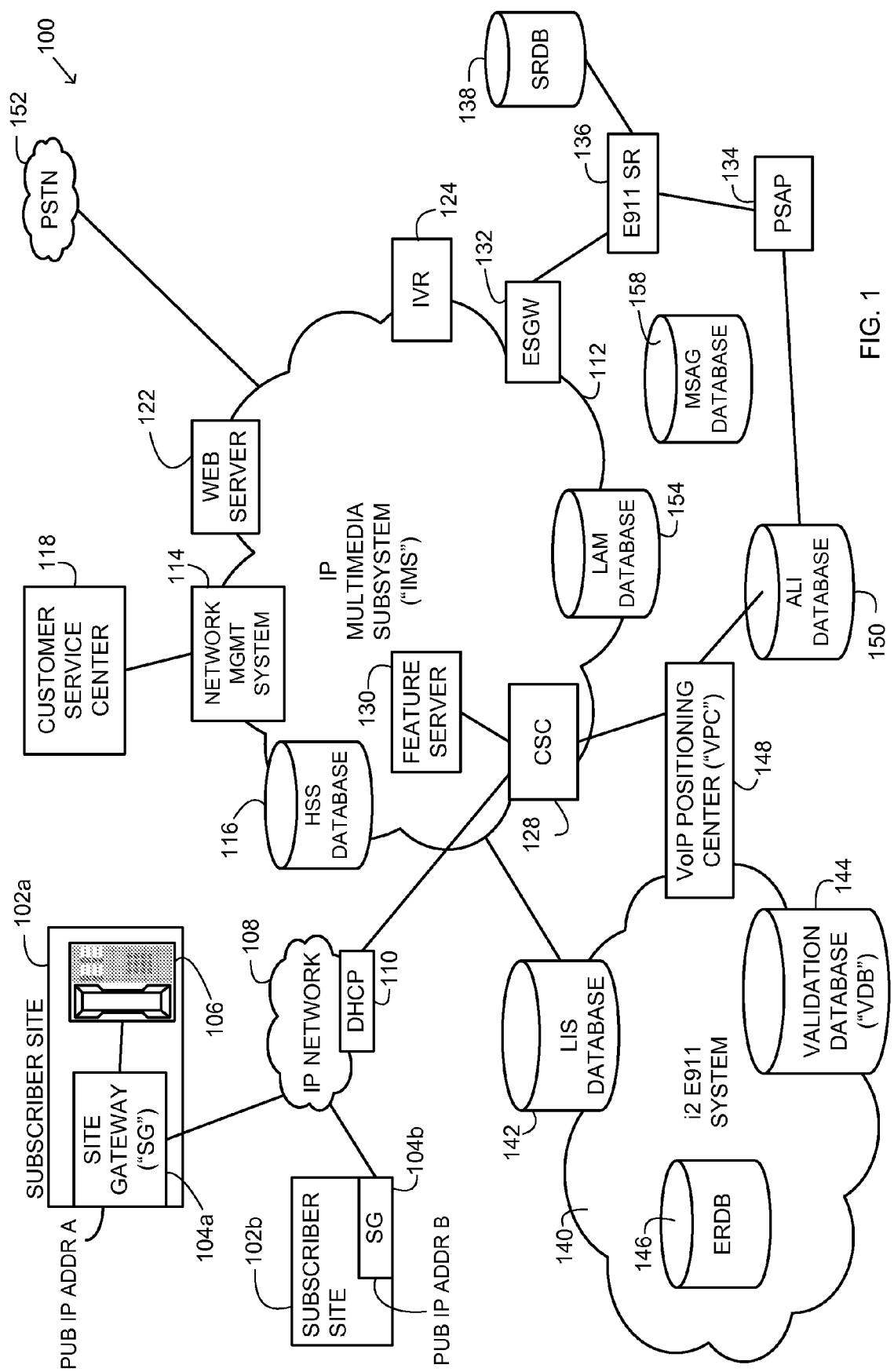
FIG. 1 is a schematic diagram depicting an example network system.

The example methods and apparatus described herein may be used to manage location information associated with voice over internet protocol ("VoIP") devices to support E911 services for those VoIP devices. Traditional E911 services based on the plain old telephone system ("POTS") provide POTS telephone service subscribers with emergency assistance service that is capable of pinpointing the geographic calling location of a caller for emergency personnel (e.g., firemen, policemen, paramedics, etc.). In this manner, although a caller may be unable to speak into the telephone due to, for example, illness or injury, the receiving 911 dispatcher can obtain a physical address or geographic location from which the caller is calling and dispatch emergency personnel to that location. Unlike traditional POTS telephone service, which is implemented in connection with traditional wireline telephone numbers that are associated with corresponding fixed geographic locations (e.g., a subscriber's home street address), IP-enabled communication services (e.g., VoIP services) do not always restrict an IP telephone number to being permanently associated with or assigned to (e.g., located at, connected at, etc.) a particular geographic location. Instead, some VoIP service providers enable a VoIP device associated with a particular telephone number to nomadically move or roam through a service provider network or through various service provider networks. That is, a subscriber may disconnect a VoIP device from a service provider network at a first location (e.g., the subscriber's home) and reconnect the VoIP device into the same service provider network or a different service provider network at a second location (e.g., a work place). The example systems and methods described herein enable service provider networks to provide E911 services to subscribers even though these subscribers move their VoIP devices between various locations. As described in greater detail below, the example systems and methods determine when a VoIP device has been moved between two network locations and prompt a user of the moved VoIP device to confirm a geographic location change and/or provide updated geographic location information (e.g., a current street address) associated with the current network location of the VoIP device. Some example implementations determine when a VoIP device is not eligible for nomadic use and deny VoIP services to nomadic-disabled devices when they identify an attempt to operate the VoIP device in a network location different from the VoIP devices registered location. Alternatively or additionally, the example systems and methods can be used to deny service to VoIP devices connected to networks or portions of a network for which a VoIP service provider cannot provide E911 service. A VoIP service provider may be a telephone company, a cable company, a satellite company, an Internet service provider, a utility (e.g., electricity) service provider, etc.

Some disclosed example methods of managing location information for emergency support of a VoIP communication device involve determining a geographic location change status associated with the internet protocol device. A message (e.g., an audio message, a text message, a video message, etc.) is then presented via the VoIP device based on the geographic location change status requesting a user to confirm whether a registered geographic location (e.g., a street address) associated with the VoIP device is a current geographic location of the VoIP device.

In some example implementations, a current IP address associated with the VoIP device (e.g., a registration public IP address used by the VoIP device to register with a VoIP network) is used to determine the geographic location change status of the VoIP device. For example, the current IP address can be compared to a previous IP address (e.g., a registered IP address) registered in associated with the VoIP device. If the current IP address and the previous IP address differ, the geographic location change status is updated to indicate that the geographic location of the VoIP device may have changed from a geographic location previously registered in association with the VoIP device. A network server (e.g., a dynamic host configuration protocol ("DHCP") server) may assign the current IP address to the VoIP device or to a network access device (e.g., a residential gateway) connected to the VoIP device and through which the VoIP device accesses network services.

A service provider network may use the geographic location change status to set an operating mode of the VoIP device. In an example implementation, a geographic location change status indicating that the VoIP device has not moved to another geographic location corresponds to an unrestricted operating mode (S0 mode) that enables the VoIP device to access substantially all subscribed to communication services provided by a service provider associated with the VoIP device. Another geographic location change status of the illustrated example indicating that the VoIP device may have moved to another geographic location corresponds to a suspended operating mode (S1 mode) that restricts the VoIP device to accessing a subset of all otherwise available communication services provided by a service provider. For example, in the suspended operating mode, the VoIP device may be allowed to receive VoIP calls and make VoIP calls to one or more telephone numbers (e.g., a customer service telephone number, a 911 operator) pre-selected by a VoIP service provider. Yet another geographic location change status of the illustrated example indicating that the IP device is located within a geographic location at which a VoIP service provider cannot provide emergency service (e.g., E911 service) corresponds to a restricted operating mode (S2) that may allow access to the same or less (e.g., none) services than the suspended (S1) operating mode.

In some example implementations, the operating mode may be selected by a service provider network based on a user's response to a message presented via the VoIP device. For example, the service provider network may select a particular operating mode if the user confirms that the registered geographic location is the same as the currently logged geographic location. Additionally or alternatively, the service provider network may determine whether the IP device is eligible to roam (i.e., the VoIP device is nomadic-enabled) between different network locations of the service provider network. The service provider network can then select an operating mode that denies access to at least some services if the VoIP device is not eligible to roam. (i.e., the VoIP device is nomadic-blocked). After setting the operating mode of the VoIP device, another message (e.g., an audio message, a text message, a video message, etc.) may be presented via the VoIP device to inform a user of the operating mode change and/or the reason for the change.

Some disclosed example systems to manage location information for emergency support of a VoIP communication device include an interface configured to receive a current IP address (i.e., a registration IP address) associated with the VoIP device. These example systems also include a comparator configured to compare the current IP address with a registered IP address. The comparison indicates that the VoIP device may have been moved (e.g., a suspected location change) or that the VoIP device has not been moved. If a suspected location change is indicated, the system may interact with the user to confirm and/or update records to reflect the current geographic location. For instance, the example system includes a user interface (e.g., an interactive voice response ("IVR") interface) configured to present a message (e.g., an audio message, a text message, a video message, etc.) via the VoIP device based on the comparison requesting a user to confirm whether a registered geographic location (e.g., a street address) associated with the VoIP device is the same as a current geographic location of the VoIP device and/or to identify the current geographic location of the VoIP device.

The response may indicate that the VoIP device has been moved or has not been moved from a first geographic location to a second geographic location. The user interface may be further configured to instruct the user to navigate to an internet location (e.g., a webpage) to update the registered geographic location when, for example, the response indicates that the VoIP device has been moved from a first geographic location to a second geographic location.

The current IP address (i.e., the registration IP address) may be assigned to the VoIP device or to a network access device (e.g., a residential gateway, a site gateway, etc.) connected to the VoIP device and through which the VoIP device accesses network services. In some example implementations, the current IP address is different from the registered IP address. For example, the registered IP address may be associated with a geographic location within which the VoIP device was located prior to being associated with the current IP address. In some example implementations, the system includes a data structure configured to store the registered IP address associated the VoIP device.

To select an operating mode associated with the VoIP device based on the comparison of the current IP address and the registered IP address, some example systems are provided with a mode selector. The mode selector may also select the operating mode based the user's response to the message. In an example implementation, the mode selector is configured to set the operating mode to restrict the VoIP device to access a subset of all communication services associated with a service subscription corresponding to the VoIP device. The system may also be provided with a services interface configured to determine whether the VoIP device is eligible for nomadic use and configured to cause the mode selector to set the operating mode to deny access to at least some services if the VoIP device is not eligible for nomadic use.

To facilitate the process of obtaining current geographic addresses from users, example methods and systems described below are configured to store an address list of geographic addresses for each subscriber at a network storage location and copies of the address lists for the corresponding subscribers at respective subscriber VoIP devices. The address lists are advantageously useful to subscribers that move their VoIP devices often between the same locations such as, for example, between a subscriber's home and one or more office locations. For example, some VoIP subscribers often move between office and home locations on a regular basis. Other VoIP subscribers may move to the same temporary location (e.g., a vacation home, a hotel, or an apartment) when traveling or commuting for business. As described above, when a network detects that a VoIP device has moved, the network requests the subscriber of the VoIP device to provide the current geographic address at which the VoIP device is being used. In some instances, it is relatively inefficient and costly for VoIP service providers to collect current geographic addresses and to validate those addresses each time a subscriber moves to a different location. To reduce the amount of work required by a VoIP service provider to receive and validate a current geographic address and the amount of work required by a subscriber to provide a current geographic address, the example methods and systems described below can be used to store an address list of previously submitted geographic addresses in a subscriber's VoIP device so that the subscriber can select a current address from the list of available geographic addresses each time the subscriber moves to a different location.

To implement geographic address lists for VoIP service subscribers, a VoIP service provider network is provided with a goegraphic address database or data structure referred to herein as a Location Assistant for VoIP Mobility ("LAM") database. The LAM database stores geographic address data records for each VoIP subscriber. The LAM database is configured to compile geographic addresses into geographic address lists corresponding to respective VoIP subscribers and to communicate the geographic address lists for storage in a device configuration server (e.g., a network management system) of a VoIP service provider. The device configuration server can then communicate the geographic address lists to the respective VoIP devices of their subscribers. The LAM database can also subsequently provide updates (e.g., address additions, address deletions, address modifications, etc.) to the address lists stored at the device configuration server and/or the address lists stored at the VoIP devices. In this manner, a given VoIP device can present geographic addresses from an address list to a subscriber as selectable choices that the subscriber can select to indicate a current geographic address when the subscriber moves the VoIP device between different locations.

An example method for implementing geographic address lists involves storing first and second geographic location information (e.g., geographic street addresses) in a first list of geographic location information associated with a VoIP device to enable provisioning of location-based emergency services to the VoIP device. The first list is stored at a service provider storage location. In the illustrated discussion below, at least a partial copy of the first list is communicated from the service provider storage location to the VoIP device for storing as a second list of geographic location information in the VoIP device.

In some example implementations, the LAM database enables subscribers to select current geographic addresses in the LAM database via a web page or by calling a VoIP service provider customer service number. For example, the LAM database may be communicatively coupled to a web page via a secure communication path (e.g., a hypertext transfer protocol over secure socket layer ("HTTPS") communication path). The web page can present a list of geographic addresses stored in the LAM database in association with the subscriber's account number to enable the subscriber to select one of the geographic addresses as the current geographic address. A subscriber may alternatively elect to call a customer service number and speak to a customer service agent or interact with an interactive voice response ("IVR") system to select a current geographic address. The customer service agent or the IVR can then update the current geographic address in the LAM database.

Although the LAM database is described below in connection with providing location-based emergency services (e.g., E911 services) to users of VoIP devices, the LAM database can be used in connection with other location-based services provided by VoIP service providers. For example, based on a current geographic address set in the LAM database for a particular subscriber, a VoIP service provider can communicate location-specific advertisement information or other information of interest (e.g., nearby points of interest, location-specific weather information, or any other location-specific information) to the VoIP device of the subscriber. As discussed below, the LAM database is provided with one or more secure access interfaces (e.g., HTTPS interfaces) to enable subscribers, VoIP customer service agents, or network operators to access information in the LAM database. Such access interfaces can be configured for use in connection with location management for emergency services support or for use in connection with other location-based VoIP provider services. In some example implementations, the LAM database can be configured to include other interfaces that enable network entities, devices, or systems to access the LAM database to implement the other VoIP provider services.

As will be readily apparent to persons of ordinary skill in the art, the example methods, apparatus, and systems described herein may be implemented using instructions stored on one or more machine accessible media (e.g., a CD-ROM, a magnetic storage device, an optical storage device, a solid-state storage device, etc.) associated with one or more network system devices. In this manner, the machine accessible media may be used to enable network system devices to retrieve and execute the instructions to implement the example methods, apparatus, and systems described herein.

An example network system 100 is shown in FIG. 1. The example system 100 of FIG. 1 includes subscriber sites 102a and 102b. Each of the subscriber sites 102a and 102b includes a respective subscriber site gateway 104a and 104b (e.g., a residential gateway). The subscriber sites 102a-b may be residential dwellings and/or business sites (e.g., a coffee shop, an education facility, an office, an industrial building, etc.), and may have separate respective LAN's and/or PBX's located therein which are communicatively coupled to a respective one of the site gateways 104a-b. In the illustrated example, the site gateways 104a and 104b are used to provide user equipment (e.g., VoIP devices, computers, etc.) network access to the example network system 100 and may be implemented using wire-interface gateways (e.g., wired Ethernet, IEEE-802.3, Universal Serial Bus ("USB"), etc.) or wireless gateways (e.g., wireless Ethernet, IEEE-802.11, Wi-Fi®, Bluetooth®, etc.).

In the illustrated example, a VoIP device 106 (e.g., a wired or wireless VoIP telephone, a plain old telephone system ("POTS") analog telephone connected to an analog telephone adapter ("ATA"), a wired or wireless IP data/voice communicator, a personal desktop, laptop, or tablet computer having VoIP capabilities, etc.) is communicatively coupled to the subscriber site gateway 104a. The site gateway 104a provides the VoIP device 106 network access to an Internet protocol ("IP") network 108, which may include one or more Internet service provider ("ISP") networks. The VoIP device 106 is capable of making VoIP calls via the example IP network 108. The IP network 108 includes a function that assigns public IP addresses to the site gateways 104a-b. In the illustrated example, the function to assign public IP addresses may be implemented using, for example, a dynamic host configuration protocol ("DHCP") server 110. As shown in the illustrated example of FIG. 1, the first site gateway 104a is assigned a public IP address A and the second site gateway 104b is assigned a public IP address B. Although two subscriber sites (i.e., the subscriber sites 102a-b) and two site gateways (i.e., the site gateways 104a-b) are shown in FIG. 1, any number of subscriber sites and site gateways may be used in connection with the examples described herein.

In the illustrated example, the VoIP device 106 can be associated with a non-nomadic service (i.e., a nomadic-blocked service) or a nomadic service (i.e., a nomadic-enabled service). A non-nomadic service limits the VoIP device 106 to making VoIP calls from only a pre-selected network location (e.g., from only the subscriber site 102a). Under a non-nomadic service, the VoIP device 106 may be used to make VoIP calls from, for example, the subscriber site 102a, but not from the subscriber site 102b. In contrast, a nomadic service allows the VoIP device 106 to make calls from a plurality of network locations. That is, in the illustrated example, the VoIP device 106 can be used to make VoIP calls from both of the subscriber sites 102a-b. A subscriber or user can change the nomadic option for the VoIP device 106 via the user's account. In some example implementations, the VoIP device 106 may be associated with a plurality of telephone numbers. For each telephone number, a user can select a different nomadic option. In this manner, when the VoIP device 106 is used from a home location (e.g., the subscriber site 102a), any of a plurality of telephone numbers associated with the VoIP device 106 can be used to make VoIP calls. However, when the VoIP device 106 is connected to a visiting site (e.g., the subscriber site 102b), only those telephone numbers associated with a nomadic option can be used to make VoIP calls.

To enable VoIP services, the example network system 100 is provided with an internet protocol multimedia subsystem ("IMS") 112. The IMS 112 enables different communication technologies (e.g., features, services, communication software and equipment, etc.) to work together to deliver enriched communications (e.g., VoIP communications) to subscribers. The IMS 112 of the illustrated example is implemented according to one or more industry standard specifications. Although the IMS 112 is used in the illustrated example, the example systems and methods described herein may be used in connection with IP multimedia and telephony core network architectures other than the IMS 112. For example, IP multimedia and telephony core network architectures other than the IMS 112 may be used to enable VoIP services in the example network system 100.

To manage subscriber services, the IMS 112 is provided with a network management system ("NMS") 114 that is communicatively coupled to a home subscriber services ("HSS") database 116. In the illustrated example, the NMS 114 is used to manage and track which subscribers have subscribed to which features or services and to enable access to those features by subscribers. The NMS 114 stores records in the HSS database 116 having VoIP device configuration information indicative of subscriber's respective features and services. To implement a service change (e.g., provisioning, a device registration, an upgrade, an update, etc.), the NMS 114 is notified of the service change, and the NMS 114 stores information in the HSS database 116 indicative of the service change. In the illustrated example, the NMS 114 is also configured to receive and process the initial geographic location information (e.g., street addresses) associated with a VoIP device (e.g., the VoIP device 106) when VoIP service is initially provisioned. Also, the NMS 114 is configured to store geographic address lists (e.g., the geographic address list 902a of FIGS. 9 and 10) corresponding to different VoIP devices.

In the illustrated example, the NMS 114 is configured to communicate configuration updates including address list updates to VoIP devices. For example, if the NMS 114 receives a notification that a new service feature has been enabled for the subscriber account associated with the VoIP device 106, the NMS 114 can communicate a configuration update (e.g., transmit an updated configuration file) to the VoIP device 106. Additionally, when a user provides a new geographic address for storage in an address list (e.g., the geographic address list 902a of FIGS. 9 and 10) associated with the VoIP device 106, the NMS 114 communicates the updated geographic address information to the VoIP device 106.

To allow subscribers to interact with customer service representatives, the NMS 114 is coupled to a customer service center 118. In the illustrated example, a subscriber can interact with a customer service representative at the customer service center 118 to change a nomadic option associated with the VoIP device 106. In addition, when the VoIP device 106 is moved to a different geographic location, the subscriber can interact with the customer service representative to provide the street address of the new geographic location. In addition, to enable a subscriber to access a web page to change nomadic options and/or to provide the street address of current geographic location, the IMS 112 is provided with a web server 122. In the illustrated example, the web server 122 is implemented in connection with a web portal that can be accessed by subscribers an/or customer service agents to update subscriber information such as, for example, geographic address information.

To inform a subscriber of a suspected geographic location change, the IMS 112 is provided with an interactive voice response ("IVR") system 124. When a subscriber initiates a VoIP call via the VoIP device 106, the IVR system 124 is configured to playback an audio message via the VoIP device 106 when a VoIP service provider detects that the VoIP device 106 may have been moved to a different geographic location (e.g. moved from the subscriber site 102a to the subscriber site 102b). The IVR system 124 may include a sound file player and/or a text-to-speech converter (e.g., a speech synthesizer) to present one or more audio messages.

In the illustrated example, the IVR message plays back a previously registered street address or last known registered street address of the VoIP device 106 and requests the subscriber of the VoIP device 106 to confirm whether the registered street address is the same as the current street address at which the VoIP device 106 is located. The subscriber can then confirm that the street addresses are the same or, if the street addresses are different, the subscriber can change the registered street address via the IVR 124, a customer service representative, or an account web page served by the web server 122. Additionally or alternatively, the subscriber can contact the customer service center 118 to change the registered street address.

To control and process call sessions of VoIP devices (e.g., the VoIP device 106), the IMS 112 is provided with a call session controller ("CSC") 128. The call session controller 128 implements a call session control function ("CSCF") that determines whether a call should be established and which features or services should be used to establish the call based on subscribed features or services (e.g., nomadic-enabled service, calls to a PSTN allowed, etc.) of a subscriber. In the illustrated example, to register VoIP devices (e.g., the VoIP device 106) with the IMS 112, the CSC 128 is provided with a registration request interface to receive registration requests from VoIP devices and a device registrar to register the VoIP devices with the IMS 112. In the illustrated example, the device registrar is configured to perform SIP registrations when VoIP devices communicate registration requests to the IMS 112. As described below in connection with the flowchart of FIGS. 13A and 13B, the device registrar of the CSC 128 is configured to communicate a current geographic address selection associated with the VoIP device 106 (e.g., a current geographic address indicative of the location of the VoIP device 106) to the LAM database 154 during a SIP registration process. In some example implementations, the device registrar may or may not allow the VoIP device 106 to register depending on whether it is eligible for nomadic use.

The IMS 112 is also provided with a feature server 130. The feature server 130 stores the registration (current) public IP addresses (e.g., the public IP address A of the site gateway 104a) used by VoIP devices (e.g., the VoIP device 106) to register with the IMS 112. That is, when the VoIP device 106 registers with the IMS 112, the HSS 116 receives the public IP address A (i.e., a registration public IP address) used by the VoIP device 106 to register. The HSS 116 then forwards a notification including the public IP address A to the feature server 130, and the feature server 130 stores the public IP address A for future comparisons with other registration IP addresses that the VoIP device 106 may use to register. In addition to storing the public IP address A, the feature server 130 also associates itself with the VoIP device 106 for the duration of its registration. In the illustrated example, the feature server 130 also compares each registration public IP address with a corresponding registered public IP address (i.e., a public IP address used previously by the VoIP device 106 to register with the IMS 112) to determine a location change status (e.g., determine whether the VoIP device 106 may have moved from one geographic location to another).

The feature server 130 also stores the current operating mode (e.g., the unrestricted operating mode (S0 mode), the suspended operating mode (S1 mode), or the restricted mode (S2 mode)) associated with each VoIP device registered with the IMS 112. In the illustrated example, the feature server 130 is configured to change operating modes from the unrestricted operating mode (S0 mode) to the suspended operating mode (S1 mode) based on comparisons of registration public IP addresses with registered public IP addresses. For example, if the feature server 130 determines that the registration public IP address A associated with the VoIP device 106 is different from a registered public IP address associated with the VoIP device 106, the feature server 130 determines that the VoIP device 106 may have been moved from one geographic location to another. In response, the feature server 130 changes the operating mode associated with the VoIP device 106 to the suspended operating mode (S1 mode) to allow the VoIP device 106 to receive calls and/or to make calls to phone numbers pre-selected by a VoIP service provider such as, for example, a customer service phone number, but to block calls to other (non-preselected) phone numbers.

The feature server 130 is also configured to change operating modes to the suspended operating mode (S1 mode) or the restricted mode (S2 mode) at the direction of the NMS 114. For example, if the user of the VoIP device 106 registers a geographic address that is in a location for which E911 services cannot be provided, the NMS 114 can instruct the feature server 130 to change the operating mode associated with the VoIP device 106 to the restricted mode (S2 mode). The NMS 114 can also instruct the feature server 130 to change the operating mode associated with a VoIP device 106 from the restricted operating mode (S2) to the suspended operating mode (S1).

The feature server 130 is configured to determine the type of message to be presented to a user by the IVR 124 based on, for example, the operating mode associated with the VoIP device 106. In the illustrated example, when the IMS 112 processes a call from the VoIP device 106 while the operating mode of the VoIP device 106 is set to the S1 mode or the S2 mode, the feature server 130 routes the call to the IVR 124 and instructs the IVR 124 to present a message (e.g., playback an audio announcement) and/or obtain a confirmation response (e.g., a response confirming the correctness of a registered geographic address) from a user. For example, the feature server 130 may instruct the IVR 124 to present a message requesting a user to confirm whether the registered geographic location of the VoIP device 106 is correct and, if not, requesting the user to provide an updated geographic street address of the new location. In the illustrated example, the feature server 130 is also configured to change operating modes associated with the VoIP device 106 from the restricted operating mode (S1) to the unrestricted operating mode (S0) based on the confirmation response. For example, the feature server 130 can change the operating mode of the VoIP device 106 from S1 to S0 when the user confirms that the registered geographic location presented by the IVR 124 is correct.

Also, the feature server 130 informs the IVR 124 from where to obtain the registered geographic address of the VoIP device 106. In example implementations in which audio files (e.g., .wav files) are used by the IVR 124 to playback registered geographic addresses to users, the feature server 130 is configured to store uniform resource locator (URL) addresses corresponding to network locations (e.g., servers, network directories, etc.) in which the audio files are stored.

To route emergency calls, the IMS 112 is provided with an emergency services gateway ("ESGW") 132. The emergency services gateway 132 uses information received via an emergency call's call setup signaling to determine a path (e.g., a trunk) via which to route the emergency call for E911 handling.

To handle emergency calls, the example network system 100 is provided with a public safety answering point ("PSAP") 134. The PSAP 134 corresponds to a particular geographic area, and dispatchers at the PSAP 134 handle emergency calls originating from VoIP devices within that geographic area. In this manner, dispatchers can dispatch emergency services personnel from a location nearest the geographic location of a 911 caller. Although one PSAP is shown, the example network system 100 may be implemented using any number of PSAP's, each corresponding to one or more respective geographic area(s).

To route emergency calls to the PSAP 134, the example network system 100 is provided with a 911 selective router 136. The 911 selective router 136 routes emergency calls to the correct PSAP based on information received from the emergency services gateway 132 and a selective routing database ("SRDB") 138. For example, during an emergency call, the emergency services gateway 132 communicates an emergency services query key ("ESQK") to the 911 selective router 136. The ESQK is a call identifier that represents an emergency call for the duration of the call and is used by the selective router 136 to route an emergency call to the correct PSAP (e.g., the PSAP 134).

After the 911 selective router 136 receives the ESQK from the emergency services gateway 132, the 911 selective router 136 forwards the ESQK to the SRDB 138 to obtain an emergency service number ("ESN") identifying a PSAP to which to route the emergency call. The SRDB 138 stores ESQK's in association with respective ESN'S. An ESN is a number used to indicate a particular group of emergency service agencies (e.g., police department, fire department, medical agency) that serves a particular geographic area and facilitates routing an emergency call to the PSAP that serves that geographic area.

To enable the example network system 100 to implement operations associated with receiving and processing emergency calls made from VoIP devices (e.g., the VoIP device 106), the example network system 100 is provided with an i2 E911 system 140. To store street addresses in association with respective telephone numbers of VoIP devices and to determine whether a call is originating from a geographic area in which a corresponding VoIP service provider can provide E911 services, the i2 E911 system 140 is provided with a location identification server ("LIS") database 142. In the illustrated example, the LIS database 142 stores a record for each telephone number of the VoIP device 106, and each record is used to store the geographic location (e.g., the street address) of the subscriber site 102a in association with the telephone number in that record. The NMS 114 communicates initial geographic location information (e.g., initial street addresses) to the LIS database 142 during initial VoIP subscription enrollments. In addition, any time the VoIP device 106 moves to another geographic location and a corresponding subscriber provides an updated street address via, for example, the customer service center 118 or the web server 122, the IMS 112 communicates the updated street address to the LIS database 142.

The i2 E911 system 140 is also provided with an emergency services zone ("ESZ") routing database ("ERDB") 146. Each ESZ corresponds to a particular emergency service number ("ESN") that uniquely identifies the ESZ. For each ESZ, the ERDB 146 stores an emergency services routing number ("ESRN") corresponding to an E911 selective router that serves that ESZ and a respective ESN. In the illustrated example, an ESRN is used to route an emergency call to an E911 selective router serving the ESZ corresponding to the geographic area within which the emergency call originated.

During registration of a street address or when a subscriber provides an updated street address, the LIS database 142 uses the ESRN's stored in the ERDB 146 to determine whether the provided street address is located within an area in which a corresponding VoIP service provider can provide E911 service. For example, the LIS database 142 accesses the ERDB 146 to retrieve an ESRN corresponding to the provided street address and determines whether the VoIP service provider can provide E911 service to the provided street address based on the ESRN. Regardless of whether the LIS database 142 determines that the VoIP service provider can or cannot provide E911 service to the provided street address, the LIS database 142 updates the registered geographic location of the VoIP device 106 with the provided street address. However, if the LIS database 142 determines that the VoIP service provider cannot provide E911 service to the provided street address, the LIS database 142 informs the NMS 114 that the VoIP device 106 is in a location at which E911 service is not available. In this manner, the NMS 114 can instruct the feature server 130 to set the operating mode associated with the VoIP device 106 to a restricted mode (S2 mode) so that the VoIP device 106 can access only a subset of services (e.g., receive calls only, connect to a 911 dispatcher without the location-identification services of E911) that are, for example, associated with a service subscription corresponding to the VoIP device 106.

To validate geographic location information (street addresses) to be stored in the LIS database 142, the i2 E911 system 140 is provided with a validation database ("VDB") 144. The VDB 144 stores a plurality of street addresses in a format compliant with the master street address guide ("MSAG") standard. In the illustrated example, when a subscriber provides a street address, and before the street address is stored in the LIS database 142, the i2 E911 system 140 compares the user-provided street addresses with known street addresses in the VDB 144 to determine whether the provided street address is MSAG-valid. If the provided street address is MSAG-valid, then the i2 E911 system 140 validates the provided street address and updates a corresponding registered street address in the LIS database 142. Otherwise, if the provided street address is not MSAG-valid (e.g., the address includes a typographical error, an incorrect zip code, etc.), the i2 E911 system 140 indicates that the provided street address is invalid, and the IMS 112 informs the subscriber of the invalidity and requests the user to provide a MSAG-valid street address.

To retrieve emergency call routing information from the ERDB 146 and street addresses from the LIS database 142 to process an emergency call, the i2 E911 system 140 is provided with a VoIP positioning center ("VPC") 148 communicatively coupled to the CSC 128. When the CSC 128 receives an emergency call, the CSC 128 queries the VPC 148 to determine the E911 selective router to which the emergency services gateway 132 should route the emergency call.

The PSAP 134 is coupled to an automatic location identification ("ALI") database 150 to enable the PSAP 134 to retrieve geographic street addresses from which emergency calls originate. The ALI database 150 stores geographic street addresses corresponding to the locations of telephones connected to a traditional publicly switched telephone network ("PSTN") 152. The VPC 148 stores geographic street addresses associated with VoIP devices that it retrieves from the LIS database 142. When the PSAP 134 requires a street address of a VoIP device 106, the ALI 150 queries the VPC 148 for the street address. In response, the VPC 148 forwards the street address associated with the VoIP device 106 to the ALI database 150. The ALI database 150 then provides the street address to the PSAP 134.

Figure 9:
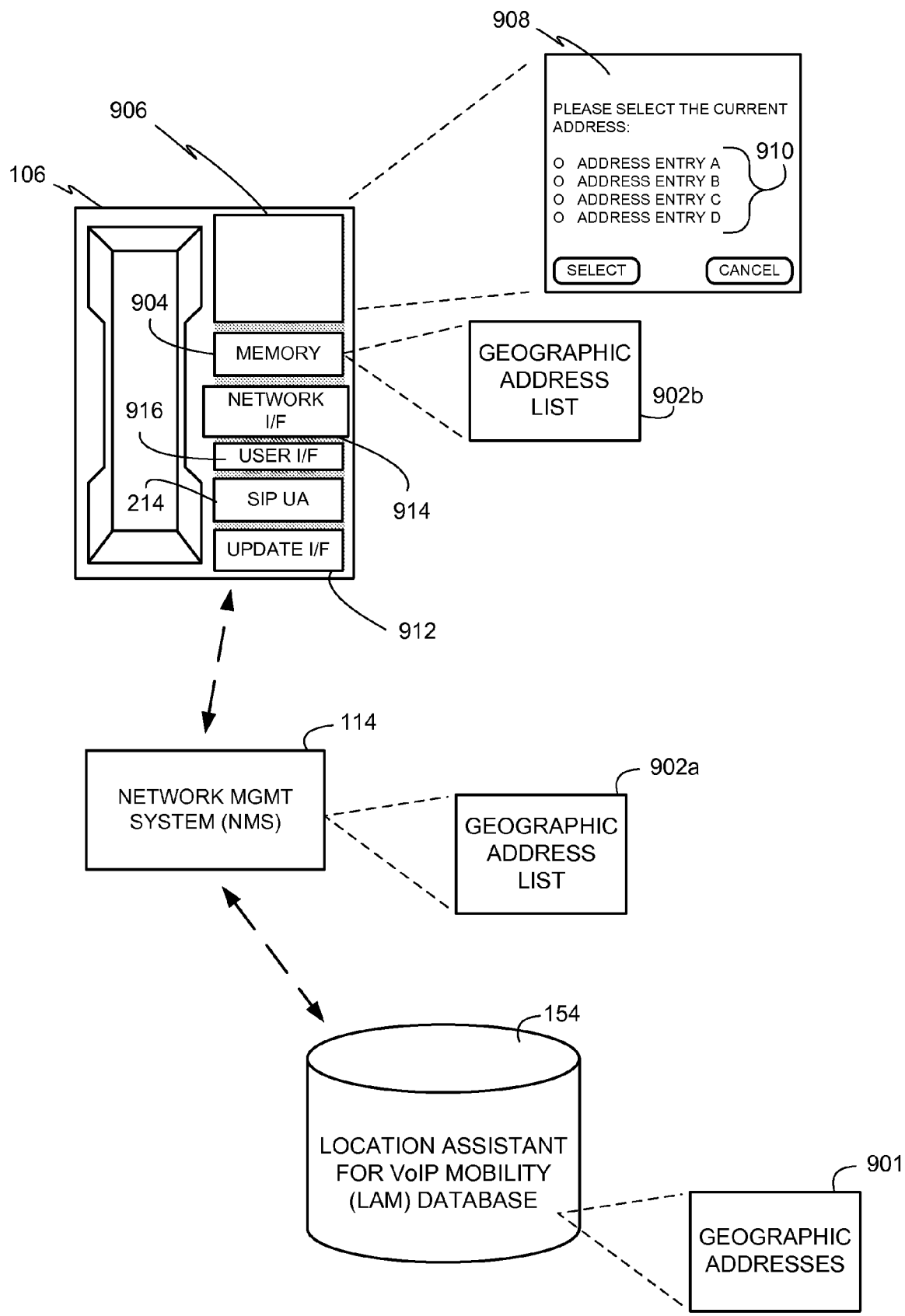
FIG. 9 shows an example Location Assistant for VoIP Mobility ("LAM") database configured to store geographic addresses, a network management system configured to store a geographic address list, and a VoIP device configured to store a copy of the geographic address list.

To store data records of geographic location information including geographic addresses corresponding to locations that subscribers have visited or may visit in the future, the IMS 112 is provided with a Location Assistant for VoIP Mobility ("LAM") database 154 (FIG. 9). The LAM database 154 is configured to store one or more geographic address data records for each VoIP subscriber. Some subscribers may choose to submit geographic addresses corresponding to the places that they most frequently visit such as, for example, a home address, an office address, a coffee shop address, etc. and/or the list of addresses may be compiled over time.

In the illustrated example, the LAM database 154 is provided with a hypertext transfer protocol over secure socket layer ("HTTPS") interface to enable subscribers or customer service representatives to access and modify geographic addresses securely via the Internet. A subscriber may provide geographic addresses to the LAM database 154 and/or set a current geographic address in the LAM database 154 via a website or a VoIP device user interface. Additionally or alternatively, the subscriber may contact a customer service agent at the customer service center 118 and speak a geographic address to be added to the LAM database 154 and/or speak a current geographic address selection. The customer service agent, in turn, can add the new geographic address in the LAM database 154 and/or set the selected current geographic address in the LAM database 154 via a customer service agent interface (e.g., a database interface, an intranet website, an internet website, a subscriber account information interface, etc.).

The LAM database 154 is configured to communicate geographic addresses to the NMS 114 (FIG. 1) to enable the NMS 114 to store address lists of respective users. In this manner, the NMS 114 can communicate the address lists and any updates (e.g., address additions, address deletions, address modifications, etc.) thereto to respective VoIP devices (e.g., the VoIP device 106). The VoIP devices store their respective address lists and are configured to present the geographic addresses in the address lists to their corresponding users as selectable choices that the user can select to indicate a current geographic address. In some example implementations, a VoIP device 106 may be configured to request an address list update during a boot up process prior to requesting to be registered with the IMS 112. In other example implementations, after registration, the VoIP device 106 may periodically or aperiodically query the NMS 114 for updates to the configuration file and/or the address list.

In some example implementations, the LAM database 154 is configured to receive geographic address information from a user before the user operates the respective VoIP device at the provided geographic address. For example, a user may proactively provide geographic addresses of the locations at which the user foresees using his/her VoIP device 106. Additionally or alternatively, the LAM database 154 may be configured to store geographic addresses automatically when subscribers provide current geographic address information each time they operate their VoIP device at a new location. For example, a user may provide a current geographic address when the network prompts the user, and the LAM database 154 can record or store the provided current geographic address in a geographic address data record corresponding to that subscriber. In this manner, the quantity of geographic address entries in the subscriber's address list increases each time the subscriber uses his/her VoIP device 106 at a new location and provides a current geographic address. When the user moves the VoIP device 106 from one location to another and powers on the VoIP device 106, the VoIP device 106 can present the list of automatically compiled geographic addresses. If the current location of the VoIP device 106 is one in which the user previously used the VoIP device 106, the geographic address of the current location will appear in the list of addresses presented by the VoIP device 106 and will be capable of being selected as the current geographic address. However, if the current location of the VoIP device 106 is one in which the user has not previously used the VoIP device 106 and the user has not otherwise provided the geographic address of the current location to the LAM database 154 (via, for example, a website), the user will need to provide the geographic address of the current location via, for example, a website, a customer service agent, the IVR 124, a VoIP device user interface, etc.

To validate geographic location information (street addresses) to be stored in the LAM database 154, the IMS 112 is provided with a master street address guide ("MSAG") database 158. The MSAG database 158 is configured to store a plurality of street addresses in a format compliant with the master street address guide MSAG standard. In the illustrated example, when a subscriber provides a street address, and the street address is stored in the LAM database 154, the LAM database 154 compares the user-provided street addresses with known street addresses in the MSAG database 158 to determine whether the provided street address is MSAG-valid. If the provided street address is MSAG-valid, then the LAM database 154 indicates the provided street address as validated and updates an address list for the corresponding user to include the validated street address. Otherwise, if the provided street address is not MSAG-valid (e.g., the address includes a typographical error, an incorrect zip code, etc.), the LAM database 154 indicates that the provided street address is not validated. The user is then able to access the provided street address via the web server 122 to correct, delete, or replace the invalid street address.

Figure 2:
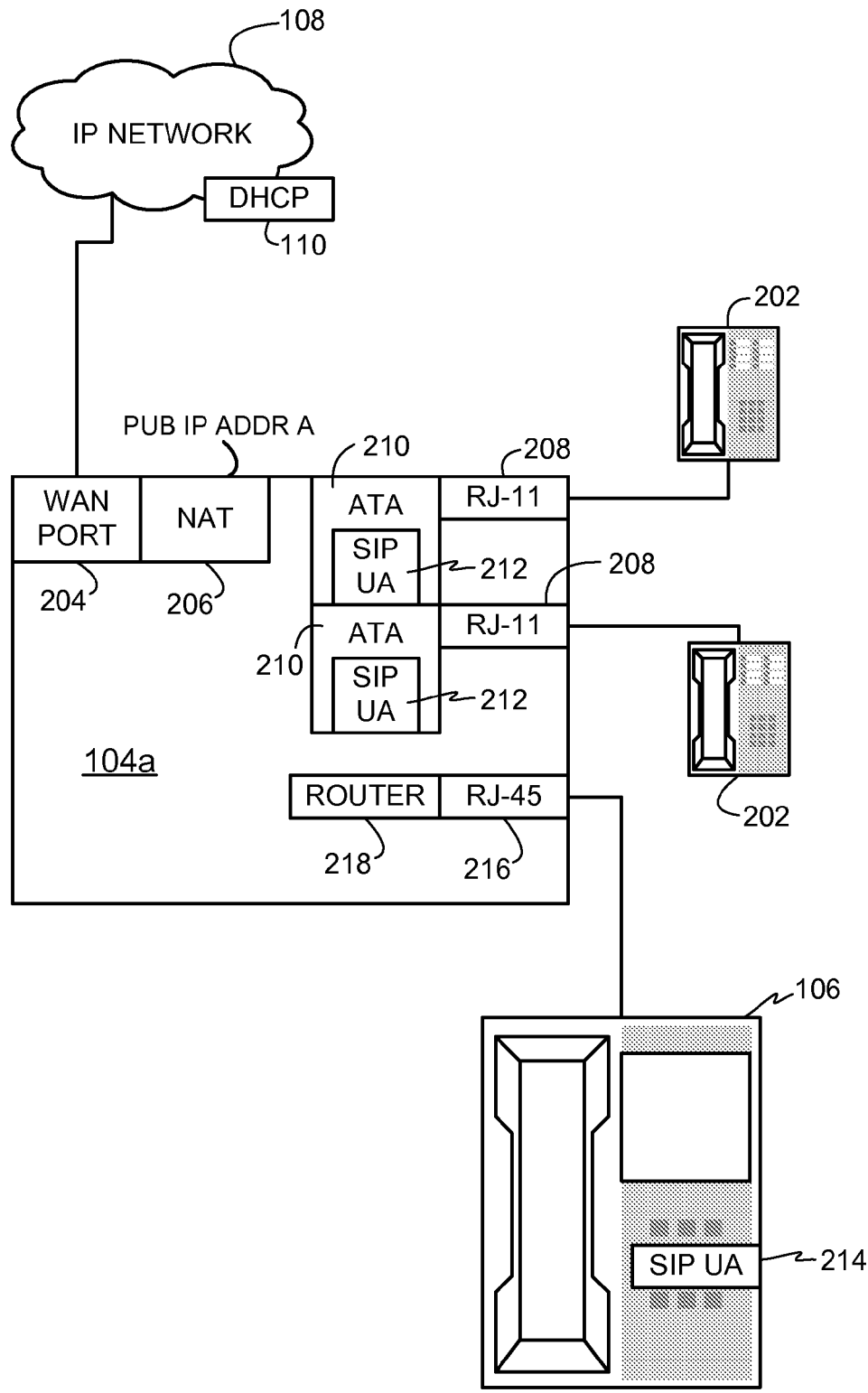
FIG. 2 illustrates an example implementation of the site gateway of FIG. 1.

FIG. 2 illustrates an example implementation of the site gateway 104a. To make VoIP calls via the site gateway 104a, a plurality of plain old telephone system ("POTS") analog telephones 202 and/or the VoIP device 106 are communicatively coupled to the site gateway 104a of FIG. 2. The site gateway 104a is provided with a plurality of RJ-11 ports 208 to which the analog telephones 202 are communicatively coupled. In addition, to convert between analog and digital communications for the analog telephones 202, the site gateway 104a is provided with analog telephone adapters ("ATA's") 210. To communicatively couple the site gateway 104a to the IP network 108, the site gateway 104a is provided with a wide area network ("WAN") port 204. In the illustrated example, the DHCP server 110 of the IP network 108 assigns a public IP address (e.g., the public IP address A) to the site gateway 104a to enable the site gateway 104a to access Internet services via the IP network 108. To enable the devices 202 to access Internet services via the site gateway 104a, the site gateway 104a associates a unique private IP address with each of the ATA's 210. To enable the device 106 to access Internet services via the site gateway 104a, the site gateway 104a associates a private IP address with the device 106. The site gateway 104a is provided with a network address translator ("NAT") 206 to translate between the private IP addresses and the public IP address A of the site gateway whenever any of the devices 202 and 106 exchange, send, and/or receive information with, to, and/or from the IP network 108 via the site gateway 104a.

To enable each of the analog telephones 202 to communicate information via a session initiation protocol ("SIP"), each of the ATA's 210 integrated in the gateway 104a is provided with a gateway-integrated SIP user agent ("SIP UA") 212. When the site gateway 104a is powered, the SIP UA's 212 register with the IMS 112 to enable the analog telephones 202 to make VoIP calls. Each time the site gateway 104a is booted (e.g., each time power is cycled), the SIP UA's 212 re-register with the IMS 112. Also, each time the site gateway 104a is booted, the DHCP server 110 of the IP network 108 may assign the same or a different public IP address to the site gateway 104a.

In the illustrated example, the VoIP device 106 includes a SIP UA 214 and is capable of exchanging digital information network packets with the site gateway 104a. Accordingly, it is not necessary to use another SIP UA (e.g., one of the SIP UA's 212) or an ATA (e.g., the ATA 210) in the site gateway 104a for communications with the VoIP device 106. As shown, the site gateway 104a is provided with an RJ-45 port 216 to which the VoIP device 106 is communicatively coupled. In addition, the site gateway 104a is provided with a router 218 for routing the network traffic corresponding to the VoIP device 106. In the illustrated example, the site gateway 104a assigns a unique private IP address to the SIP UA 214 of the VoIP device 106. After the site gateway 104a is powered and the VoIP device 106 is connected to the RJ-45 port 216, the SIP UA 214 registers the VoIP device 106 with the IMS 112 to enable the VoIP device 106 to make VoIP calls. Each time the VoIP device 106 is re-connected to the site gateway 104a or is connected to a different site gateway (e.g., the site gateway 104b of FIG. 1), the SIP UA 214 re-registers with the IMS 112.

The VoIP device 106 can be associated with one or more telephone numbers used to implement public user ID's ("PUID's"). In the illustrated example, a PUID is used to establish a VoIP call with a VoIP device 106. A conventional (XXX) YYY-ZZZZ type phone number can be used as the PUID. Alternatively or additionally, the PUID may be implemented using any other format instead of a telephone number format (e.g., an e-mail address format). When a user subscribes to a VoIP telephony service or adds a VoIP telephone line, the NMS 114 (FIG. 1) of a VoIP service provider allocates a PUID (e.g., a telephone number) to the user and stores geographic location information (e.g., a street address) in the LIS database 142 in association with the PUID. In addition, the NMS 114 identifies a plurality of features (e.g., nomadic-enabled or nomadic-blocked) associated with the PUID and stores the features in the HSS database 116 (FIG. 1). For example, if the user expects to operate the VoIP device 106 at a single location (e.g., the subscriber site 102a), the user may elect to block nomadic operation of the VoIP device. If the VoIP device 106 is moved to another geographic location, the VoIP service provider will deny the VoIP device 106 access to VoIP services because it is designated as nomadic-blocked. However, if the user expects to move the VoIP device 106 between different sites (e.g., between the subscriber sites 102a-b), the user may elect to allow nomadic operation of the VoIP device 106. In this manner, when the VoIP device 106 is moved to a different location, the VoIP service provider will allow operation of the VoIP device 106 because it is designated as nomadic-allowed.

Figure 3:
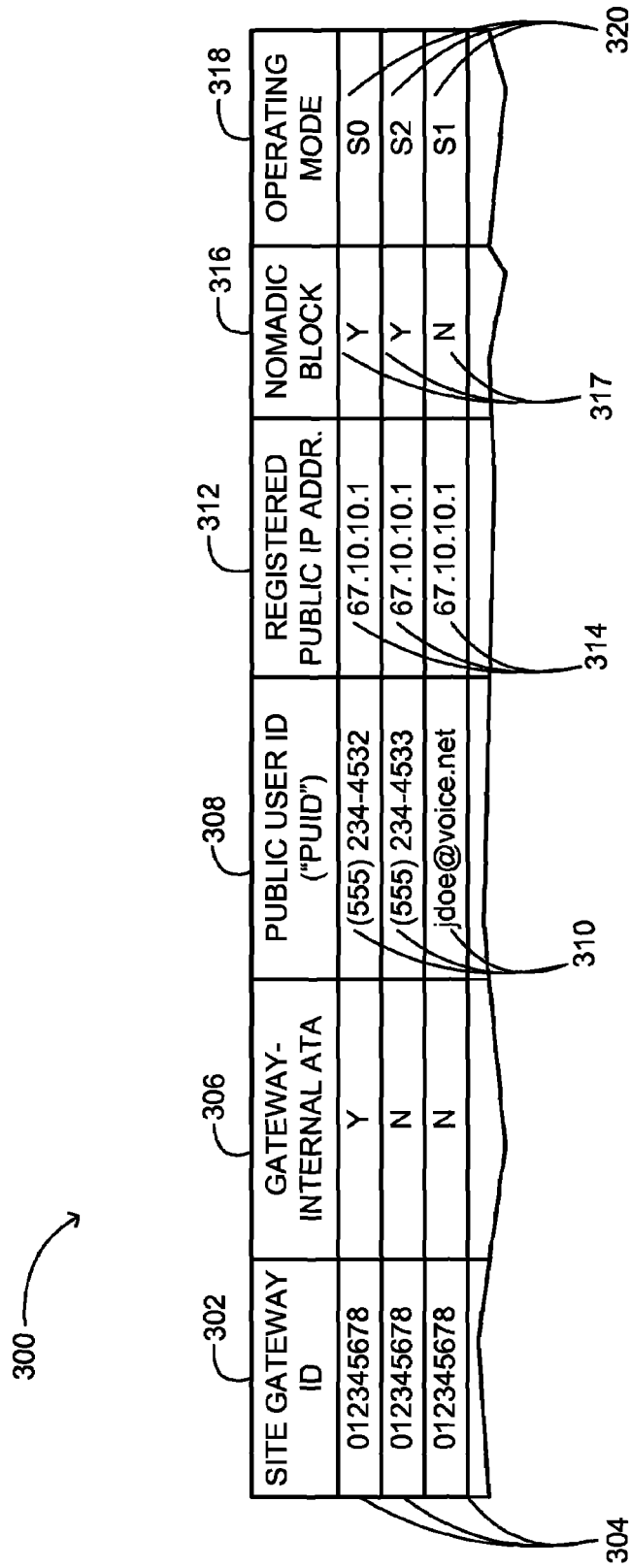
FIG. 3 is an example data structure showing account information associated with a VoIP service subscription.

FIG. 3 is an example data structure 300 showing associations between corresponding account information associated with a VoIP service subscription. The account information (e.g., features, network identifications, etc.) is associated with each PUID of a subscriber. In the illustrated example, the account information shown in the data structure 300 can be stored in different network entities of the IMS 112 (FIG. 1). For example, information shown in a particular column of the data structure 300 can be stored in the home subscriber services ("HSS") database 116 of FIG. 1, while other information in another column can be stored in the feature server 130 of FIG. 1 or any other network entity. Accordingly, particular columns of information shown in the data structure 300 may be stored throughout the example network system 100 in one or more network locations using a plurality of data structures and can be associated with one another using index keys (e.g., PUID's). However, for purposes of discussion, the information is shown in the data structure 300.

As shown in FIG. 3, the data structure 300 includes a site gateway ID column 302 that is used to store site gateway identification numbers 304 that uniquely identify the site gateway 104a of FIGS. 1 and 2. To indicate whether an ATA (e.g., one of the ATA's 210) is implemented within a gateway (e.g., the gateway 104a of FIGS. 1 and 2), the data structure 300 includes a gateway-internal ATA column 306. In the illustrated example, the gateway-internal ATA column 306 can be used to indicate that the ATA's 210 of FIG. 2 are gateway-internal ATA's.

The data structure 300 is provided with a public user ID (PUID) column 308 that is used to store a plurality of PUID's (e.g., telephone numbers) 310 assigned to a subscriber account. The PUID's 310 may be used with gateway-internal ATA's (e.g. the ATA's 210 of FIG. 2) and/or with VoIP telephones (e.g., the VoIP device 106). To associate a public IP address (e.g., the public IP addresses A and B of FIG. 1) with respective PUID's, the data structure 300 is provided with a registered public IP address column 312 having a plurality of registered public IP addresses 314. In the illustrated example, the registered public IP addresses 314 are used to detect when a VoIP device associated with one of the PUID's 310 may have been moved to another geographic location.

To indicate whether telephone numbers have been assigned a nomadic-allowed or a nomadic-blocked feature, the data structure 300 is provided with a nomadic block column 316 that stores a plurality of nomadic service designators 317. Each of the nomadic service designators 317 corresponds to one of the PUID's 310 and indicates whether the corresponding PUID's 310 is nomadic-blocked (Y) or nomadic-enabled (N). A nomadic-enabled (N) designator indicates a PUID and its associated VoIP device (e.g., the VoIP device 106) are allowed to access VoIP services when the associated VoIP device is moved away from a primary or pre-designated geographic location.

To store operating modes associated with the PUID's 310 used in combination with VoIP devices, the data structure 300 is provided with an operating mode column 318 that stores operating mode designators 320 (e.g., the operating mode designators S0, S1, and S2). In the illustrated example, the operating mode designators 320 in the operating mode column are stored in the feature server 130 of FIG. 1. In the example of FIG. 3, the S0 operating mode is an unrestricted operating mode in which a VoIP device can access substantially all VoIP services associated with a service subscription corresponding to the VoIP device (or corresponding to the PUID(s) used with that VoIP device). In contrast, the S1 operating mode is a suspended operating mode that restricts the VoIP device to use of a subset of the VoIP services associated with a service subscription corresponding to the VoIP device (or PUID(s) used with the VoIP device). The S2 operating mode of the illustrated example allows the VoIP device to access the same or less VoIP services as those allowed in the S1 (suspended) operating mode. In some example implementations, additional operating modes may be implemented (e.g., an operating mode that disallows any incoming or outgoing calls).

Figure 4:
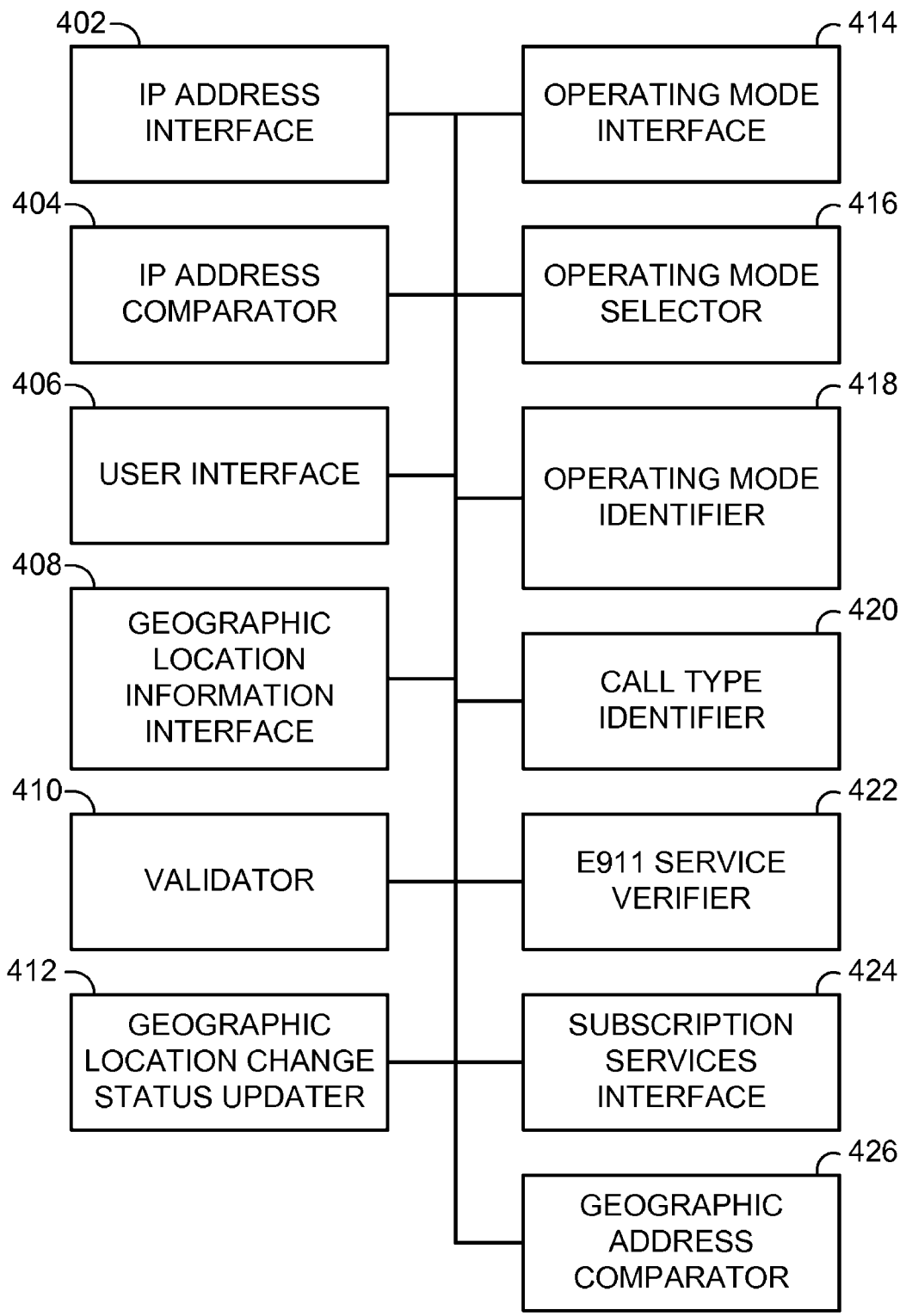
FIG. 4 is a block diagram of an example system to provide E911 service to VoIP devices.

FIG. 4 is a block diagram of an example system 400 configured to provide support functions for E911 services to VoIP devices associated with nomadic usage. The example system 400 includes an IP address interface 402, an IP address comparator 404, a user interface 406, a geographic location information interface 408, a validator 410, a geographic location change status updater 412, an operating mode interface 414, an operating mode selector 416, an operating mode identifier 418, a call type identifier 420, an E911 service verifier 422, a subscription services interface 424, and a geographic address comparator 426, all of which may be implemented using any desired combination of hardware, firmware, and/or software. For example, one or more integrated circuits, discrete semiconductor components, or passive electronic components may be used. Additionally or alternatively, some or all of the blocks of the example system 400, or parts thereof, may be implemented using instructions, code, and/or other software and/or firmware, etc. stored on a machine accessible medium that, when executed by, for example, a processor system (e.g., the example processor system 810 of FIG. 8), perform the operations represented in the flow diagrams of FIGS. 5, 6A, 6B, and 7. In the illustrated example, the blocks of the example system 400 are distributed among various network entities in the example network system 100 of FIG. 1. However, in alternative example implementations, the blocks of the example system 400 may be implemented using network entities other than those indicated below. For example, although the below description may indicate that a network entity of the example network system 100 implements one of the blocks of the example system 400, in one or more alternative example implementations, that network entity may be configured to implement two or more blocks of the example system 400 or none of the blocks. In addition, an example apparatus may be used to implement all of the blocks of the example system 400 and may be communicatively coupled to the example network system 100.

Turning in detail to the example system 400, to retrieve and store IP addresses (e.g., the public IP address A and B of FIG. 1, the public IP addresses 314 of FIG. 3, etc.), the example system 400 is provided with an IP address interface 402. In the illustrated example, the IP address interface 402 is implemented using the feature server 130 of FIG. 1. The IP address interface 402 is configured to receive public IP addresses (e.g., registration public IP addresses) via notifications from the HSS database 116 when VoIP devices register with the IMS 112. The IP address interface 402 also stores the public IP addresses in the feature server 130. In this manner, the feature server 130 can compare the received public IP addresses with future registration public IP addresses.

To compare registration public IP addresses used by VoIP devices with registered public IP address stored in association with VoIP devices (or PUID's used in combination with the VoIP devices) within the feature server 130 of FIG. 1, the example system 400 is provided with an IP address comparator 404. The example system 400 compares registration public IP addresses (e.g., the public IP addresses A and B of FIG. 1) with registered public IP addresses (e.g., the registered public IP addresses 314 of FIG. 3) to determine whether VoIP devices may have been moved between geographic locations. In the illustrated example, the IP address comparator 404 may be implemented using the HSS database 116 and an IP address comparator substantially similar or identical to the IP address comparator 404 may be implemented using the feature server 130. In this manner, when the VoIP device 106 (FIGS. 1 and 2) registers with the IMS 112, the IP address comparator 404 in the HSS database 116 can compare the public IP address A (a registration public IP address) of the site gateway 104a with a registered public IP address that was previously registered in association with the VoIP device 106. The HSS database 116 can then determine a geographic location change status based on the comparison and allow the VoIP device 106 to register based on the geographic location change status. In addition, an IP address comparator in the feature server 130 can compare registration and registered public IP addresses to determine if the feature server 130 should change VoIP device operating modes from the S0 mode to the S1 mode.

To present messages to a user via the VoIP device 106, the example system 400 is provided with a user interface 406. In the illustrated example, the user interface 406 is implemented using the IVR system 124 of FIG. 1 and is configured to playback audio messages to a user via the VoIP device 106. For example, the user interface 406 may have an audio file player or a text-to-speech converter (e.g., a speech synthesizer). Example audio messages include registered street addresses associated with the VoIP device 106 and requests for user to confirm whether a registered street address is the same as a current street address of the VoIP device 106. Other example audio messages include informing a user via the VoIP device 106 of operating modes of the VoIP device 106 and information on how to update registered street addresses. In other example implementations, the user interface 406 may also be configured to communicate and/or exchange text messages and/or other messages (e.g., video messages) with the VoIP device 106 so that some or all messages described above can be presented via a display of the VoIP device 106. In some example implementations, the functionality described in connection with the user interface 406 may be implemented using an external media server having a standard control interface, and the user interface 406 can be provided with a media server control interface to exchange information with the external media server.

To retrieve and/or store registered and/or user-provided geographic location information (e.g., registered street addresses), the example system 400 is provided with a geographic location interface 408. In the illustrated example, the geographic location interface 408 is implemented using the IVR 124 of FIG. 1 and is configured to access the LIS database 142 to retrieve registered geographic location information associated with corresponding PUID's of VoIP devices. As discussed above, a user may provide geographic location information via a web page served by the web server 122 or via a customer service representative in the customer service center 118. The web server 122 or the customer service center 118 then communicate the user-provided geographic location information to the LIS database 142. The LIS database 142 then updates registered geographic location information stored therein using the user-provided geographic location information if the validation database ("VDB") 144 of FIG. 1 determines that the user-provided geographic location information is valid (e.g., valid based on the master street address guide ("MSAG") standard).

To validate user-provided geographic location information, the example system 400 is provided with a validator 410. In the illustrated example, the validator 410 is implemented using the VDB 144 of FIG. 1 and is configured to determine whether user-provided geographic location information is MSAG-valid. For example, if the validator 410 finds a street address stored in the VDB 144 to match the user-provided geographic location information, then the validator 410 indicates the user-provided geographic location information is valid.

To update geographic location change statuses associated with VoIP devices (e.g., the VoIP device 106 of FIGS. 1 and 2) and their respective PUID's (e.g., the PUID's 310 of FIG. 3), the example system 400 is provided with a geographic location change status updater 412. In the illustrated example, the geographic location change status updater 412 is implemented using the feature server 130 of FIG. 1 and is configured to update the location change status (e.g., geographic location has not changed, geographic location may have changed, etc.) associated with a VoIP device when the IP address comparator 404 determines that a registered public IP address associated with the VoIP device 106 and a current public IP address used by the VoIP device 106 (during, for example, registration) do not match.

To retrieve and store operating modes associated with VoIP devices, the example system 400 is provided with an operating mode interface 414. In the illustrated example, the operating mode interface 414 is implemented using the feature server 130 of FIG. 1 and is configured to store operating mode designators (e.g., the operating mode designators 320 of FIG. 3) in the feature server 130 and retrieve operating mode designators from the feature server 130.

To select operating modes for association with VoIP devices, the example system 400 of FIG. 4 is provided with an operating mode selector 416. In the illustrated example, the operating mode selector 416 is implemented using the feature server 130 of FIG. 1 and is configured to select operating modes (e.g., the operating modes S0, S1, or S2) based on location change statuses associated with VoIP devices, based on whether registered geographic location information is up to date, and/or based on whether VoIP devices are in locations for which VoIP service providers can provide E911 service. To detect which operating modes are associated with VoIP devices, the example system 400 of FIG. 4 is provided with an operating mode identifier 418. In the illustrated example, the operating mode identifier 418 is implemented using the feature server 130 of FIG. 1.

To identify the type of calls initiated by VoIP devices, the example system 400 is provided with a call type identifier 420. In the illustrated example, the call type identifier 420 is implemented using the feature server 130 and is configured to determine whether calls are being made to 911 or to a PUID authorized by a VoIP service provider. For example, when the VoIP device 106 is associated with the S1 (suspended) mode, a VoIP service provider allows the VoIP device 106 to make calls only to 911 or to pre-selected, authorized numbers (e.g., a customer service number). To enable the allowed calls, the call type identifier 420 extracts information from a call initiation signal communicated by the VoIP device 106 and identifies the call type.

To determine whether a VoIP service provider of the VoIP device 106 can provide E911 service at a location within which the VoIP device 106 is located, the example system 400 is provided with an E911 service verifier 422. In the illustrated example, the E911 service verifier 422 is implemented using the LIS database 142 of FIG. 1. Also in the illustrated example, if the E911 service verifier 422 determines that the VoIP service provider of the VoIP device 106 cannot offer E911 service, the feature server 130 is configured to forward any 911 calls made from the VoIP device 106 to a 911 operator that will handle or process the 911 call without the location-identifying features of E911 service.

To determine the service subscriptions associated with a particular VoIP device, the example system 400 is provided with a subscription services interface 424. In the illustrated example, the subscription services interface 424 is implemented using the HSS database 116 of FIG. 1 and is configured to retrieve service options (e.g., the nomadic service designators 317 of FIG. 3) from subscriber accounts stored in the HSS database 116 to determine the services to which users are subscribed.

To compare geographic addresses, the example system 400 is provided with a geographic address comparator 426. In the example illustrated in FIG. 4, the geographic address comparator 426 can be implemented using the device registrar of the CSC 128 (FIG. 1). The geographic address comparator 426 is configured to compare a geographic address received during a SIP registration process from the VoIP device 106 to a geographic address registered as a current geographic address for the VoIP device 106.

FIGS. 5, 6A, 6B, and 7 are flowcharts representative of example machine readable instructions that may be executed to detect geographic location changes of VoIP devices, process VoIP calls initiated by VoIP devices, and update registered geographic location information associated with VoIP devices to implement the example system 400 of FIG. 4. Although the example machine readable instructions are described with reference to the flowcharts of FIGS. 5, 6A, 6B, and 7, persons of ordinary skill in the art will readily appreciate that other methods of detecting geographic location changes, processing VoIP calls, updating geographic location changes and, generally, implementing the example system 400 of FIG. 4 may additionally or alternatively be used. For example, the order of execution of the blocks depicted in the flowcharts of FIGS. 5, 6A, 6B, and 7 may be changed, and/or some of the blocks described may be rearranged, eliminated, or combined.

Figure 5:
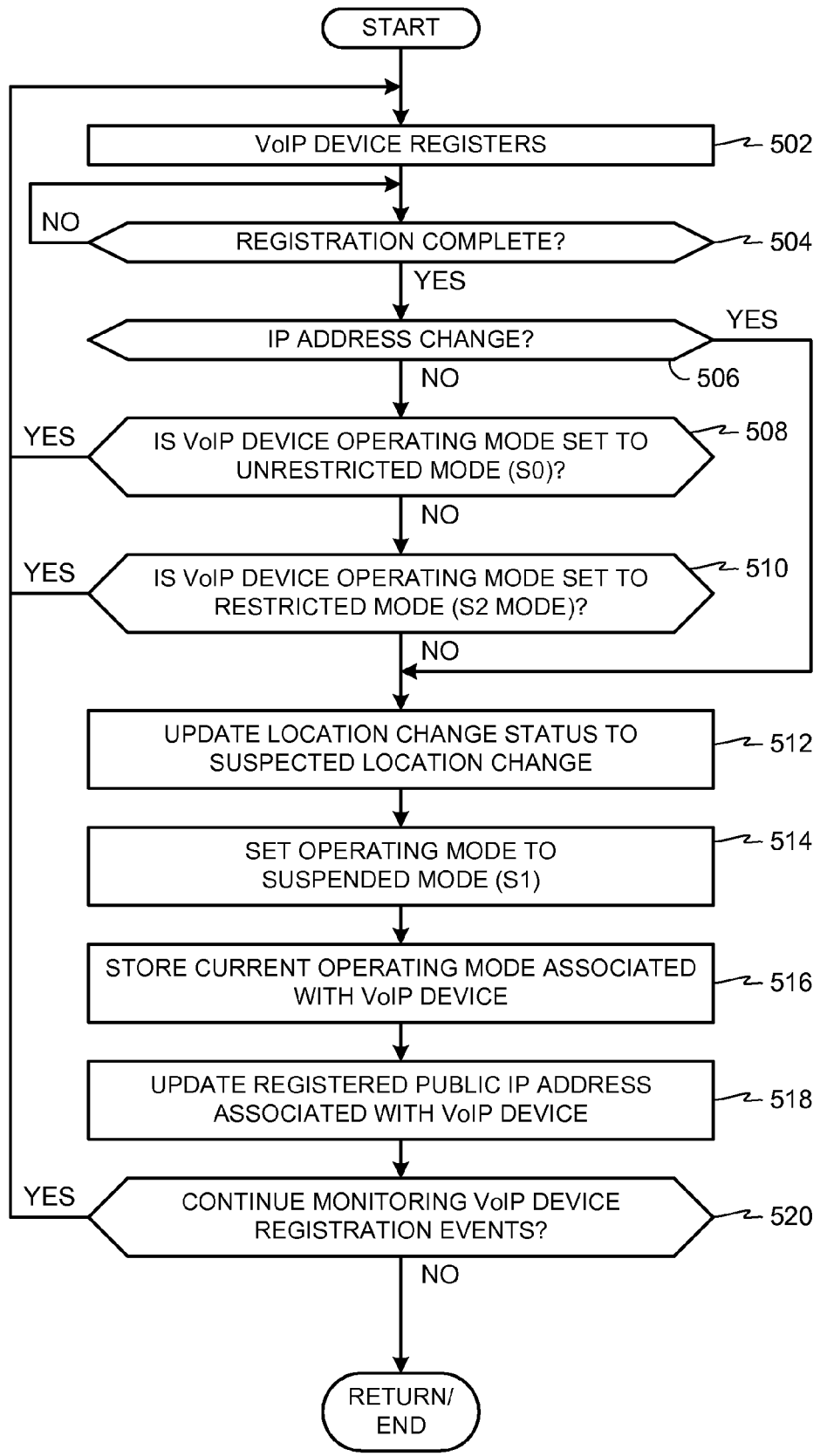
FIG. 5 is a flowchart representative of example machine readable instructions that may be executed to determine whether a VoIP device may have been moved to another geographic location.

FIG. 5 is a flowchart representative of example machine readable instructions that may be executed to determine whether the VoIP device 106 may have been moved to another geographic location. Initially, the VoIP device 106 of FIGS. 1 and 2 registers with the IMS 112 (block 502). During the VoIP device registration process (block 502), the HSS database 116 can prevent the VoIP device 106 from registering if the subscription services interface 424 (FIG. 4) determines that the VoIP device 106 is not nomadic-enabled. However, if the HSS database 116 does allow the VoIP device 106 to register, but registration is not complete (block 504), the process of FIG. 5 waits at block 504 until registration is complete. Otherwise, if registration is complete (block 504), the IP address comparator 404 (FIG. 4) determines whether the public IP address (e.g., the public IP address A of FIG. 1) associated with the VoIP device 106 has changed (i.e., if the registration public IP address used to register the VoIP device is different from the previously registered public IP address stored in the feature server 130 of FIG. 1) (block 506).

During the registration process of block 502, the IP address interface 402 stores the registration public IP address of the VoIP device 106 in the feature server 130. At block 506, to determine whether the registration public IP address associated with the VoIP device 106 is different from the registered public IP address associated with the VoIP device 106, the IP address comparator 404 retrieves the registered public IP address and the registration public IP address from the feature server 130 and compares the IP addresses to determine whether they are identical (block 506). In the illustrated example, the public IP addresses can be identical if the VoIP device 106 registers or attempts to register from the same network location (e.g., the subscriber site 102a of FIG. 1) two or more consecutive times because the public IP address of the network location gateway (e.g., the public IP address A of the site gateway 104a of FIG. 1) is stored in the feature server 130 during each registration process. In some cases, during a first registration process, the VoIP operating mode may be set to the S1 (suspended) mode if the user of the VoIP device 106 does not confirm or update the registered geographic location information. Thus, during subsequent registration attempts, although the registered public IP address and the public IP address used to register the VoIP device 106 may be the same, the example system 400 will limit operation of the VoIP device 106 to the S1 (suspended) mode until the user confirms or updates the registered geographic location information.

If the public IP addresses are the same (i.e., no IP address change has occurred) (block 506), the operating mode identifier 418 (FIG. 4) determines whether the operating mode associated with the VoIP device 106 is set to the S0 (unrestricted) mode (block 508). In the illustrated example, the operating mode interface 414 retrieves the current operating mode designator (e.g., one of the operating mode designators 320 of FIG. 3) associated with the VoIP device 106 from the feature server 130 of FIG. 1 and the operating mode identifier 418 determines whether the operating mode designator indicates the S0 (unrestricted) operating mode (block 508). If the operating mode identifier 418 determines that the VoIP device operating mode is not set to the S0 (unrestricted) operating mode, the operating mode identifier 418 determines if the VoIP device operating mode is set to the S2 (restricted) operating mode (block 510).

If the operating mode identifier 418 determines that the operating mode is not set to the S2 (restricted) mode (block 510) or if the IP address comparator 404 determines that the public IP address associated with the VoIP device 106 has changed (block 506), the geographic location change status updater 412 (FIG. 4) updates the location change status associated with the VoIP device 106 to "suspected location change" (block 512) to indicate that the VoIP device 106 may have been moved to a different geographic location. Also, the operating mode selector 416 (FIG. 4) sets the operating mode associated with the VoIP device 106 to the S1 (suspended) mode (block 514). For cases in which the operating mode selector 416 has previously set the operating mode associated with the VoIP device 106 to the S1 (suspended) mode, the operating mode selector 416 may be configured to confirm at block 514 that the operating mode associated with the VoIP device 106 is set to the S1 (suspended) mode.

The operating mode interface 414 then stores the current operating mode associated with the VoIP device (block 516) in, for example, the feature server 130 of FIG. 1 (e.g., in the operating mode column 318 of FIG. 3). Also, the IP address interface 402 updates the registered public IP address associated with the VoIP device 106 (block 518) in, for example, the feature server 130 of FIG. 1 (e.g., in the public IP address column 312 of FIG. 3) by replacing the previously registered public IP address with the registration public IP address received at block 502.

The example system 400 then determines whether it should continue monitoring VoIP device registration events (block 520). For example, the example system 400 may determine not to continue monitoring if the monitoring operation of the example system 400 is disabled by a VoIP service provider or if the monitoring operation of the example system 400 is interrupt driven and monitors only upon detection of particular events (e.g., a VoIP device plugged into the network). In an example implementation, the example system 400 is preferably, but not necessarily, configured to continuously monitor VoIP device registration events, and block 520 always returns control to block 502.

If the example system 400 determines that it should continue monitoring for an IP address change (block 520) or if the operating mode identifier 418 determines that the VoIP device 106 is associated with the S2 (restricted) mode (block 510) or the S0 (unrestricted) mode (block 508), control returns to block 502 for a subsequent registration of the VoIP device 106 or any other VoIP device. Otherwise, if the example system 400 determines that it should not continue monitoring for an IP address change (block 502), then the process of FIG. 5 is ended and/or control is returned to a calling function or process.

Although the example process of FIG. 5 uses the registered public IP address and the current public IP address (the registration public IP address) associated with the VoIP device 106 to determine whether the VoIP device 106 may have changed geographic locations, in alternative example implementations, other example methods may be used to detect geographic location changes of the VoIP device 106.

Figure 6A:
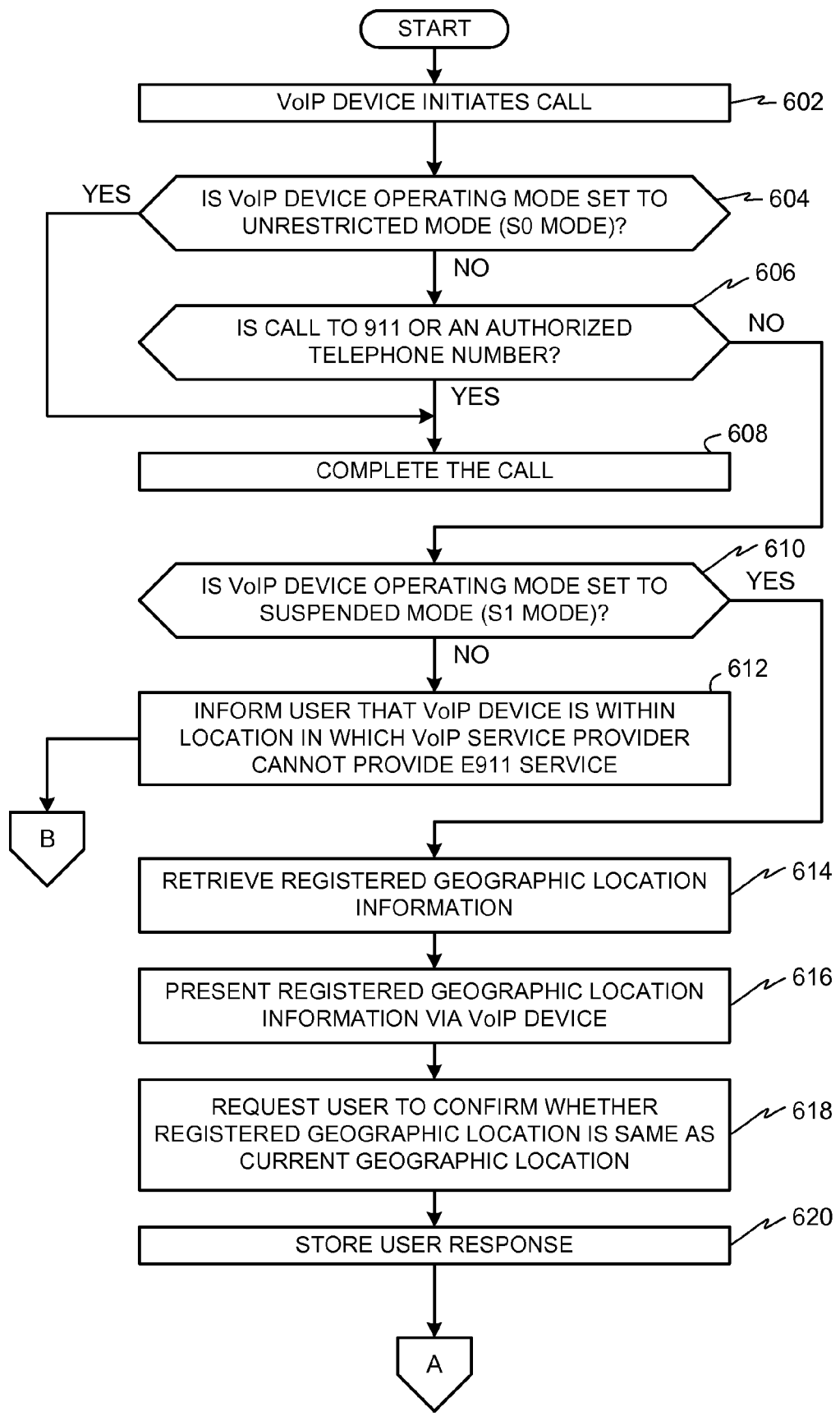
FIGS. 6A and 6B depict a flowchart representative of example machine readable instructions that may be executed to process a VoIP call initiated by a VoIP device.
Figure 6B:
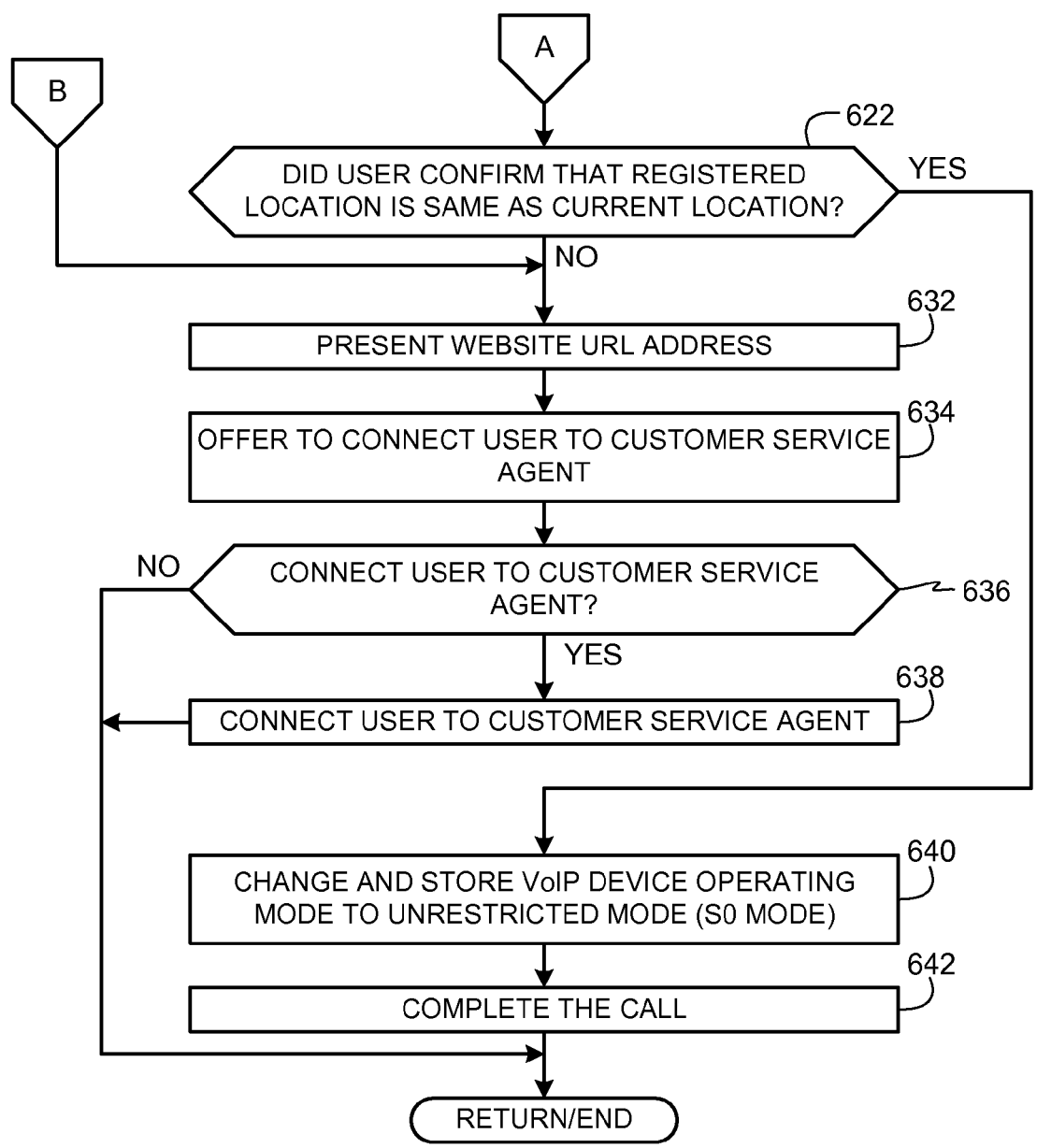

FIGS. 6A and 6B are a flowchart representative of example machine readable instructions that may be executed to process a VoIP call initiated by an example VoIP device 106. Initially, the VoIP device 106 initiates a call (block 602). In the illustrated example, the VoIP device 106 communicates a call initiation request to the CSC 128 of FIG. 1 and the CSC 128 uses the feature server 130 to initiate and process the call. The operating mode identifier 418 (FIG. 4) then determines whether the operating mode associated with the VoIP device 106 is set to an S0 (unrestricted) operating mode (block 604). In the illustrated example, to determine whether the VoIP device operating mode is set to the S0 (unrestricted) mode, the operating mode interface 414 retrieves the operating mode designator (e.g., one of the operating mode designators 320 of FIG. 3) associated with the VoIP device 106 from the feature server 130 and the operating mode identifier 418 determines whether the retrieved operating mode designator indicates the S0 (unrestricted) mode (block 604). If the operating mode identifier 418 determines that the VoIP device operating mode is not set to the S0 (unrestricted) operating mode (block 604) (i.e., the operating mode is instead set to the S1 (suspended) mode or S2 (restricted) mode), then the call type identifier 420 (FIG. 4) determines whether the call being initiated is a call to 911 or a call to an authorized telephone number (block 606) (e.g., a customer service telephone number authorized by the VoIP service provider). If the call type identifier 420 determines that the call is to 911 or to another authorized PUID (block 606), or if the operating mode identifier 418 determines that the VoIP device operating mode is set to the S0 (unrestricted) mode, the CSC 128 completes initiation of the call (block 608).

If the call type identifier 420 determines that the call is not to 911 or to another authorized telephone number (block 606), the operating mode identifier 418 determines whether the VoIP device operating mode is set to an S1 (suspended) operating mode (block 610). If the operating mode identifier 418 determines that the VoIP device operating mode is not set to an S1 (suspended) operating mode (block 610) (i.e., the operating mode is instead set to the S2 (restricted) mode), the user interface 406 presents a message via the VoIP device 106 to inform a user of the VoIP device 106 that the VoIP device 106 is within a location in which the VoIP service provider of the VoIP device 106 cannot provide E911 service (block 612). In the illustrated example, the message is an audio message presented by, for example, the IVR system 124 of FIG. 1, but any other desired messaging medium may be employed.

If the operating mode identifier 418 determines that the VoIP device operating mode is set to an S1 (suspended) operating mode (block 610), the geographic location information interface 408 (FIG. 4) retrieves registered geographic location information (e.g., a street address) associated with the VoIP device 106 (block 614). In the illustrated example, the geographic location information interface 408 accesses the LIS database 142 to retrieve the registered street address stored in association with the PUID of the VoIP device 106. The user interface 406 then presents the registered geographic location information via the VoIP device 106 (block 616) and requests the user of the VoIP device 106 to confirm whether the registered geographic location is the same as the current geographic location of the VoIP device 106 (block 618). In the illustrated example, the IVR system 124 of FIG. 1 implements the user interface 406 and performs a text-to-speech conversion of the registered street address to present an audio message via the VoIP device 106. In other example implementations, the LIS database 142 may store audio files (e.g., WAV files) of registered street addresses and the IVR system 124 may play back the audio files via the VoIP device 106. In addition, in other example implementations, the registered geographic location information may be presented (block 616) via text or video on a display screen of the VoIP device 106 and/or other user interface screens may be used to request the user to confirm the location of the VoIP device 106 (block 618). The NMS 114 then stores the user response regarding whether the registered geographic location is the same as the current geographic location of the VoIP device 106 (block 620). In the illustrated example, the user interface 406 communicates the user response to the NMS 114 along with the user's PUID and a date and time stamp of when the user responded, and the NMS 114 stores the user's PUID in association with the date and time stamp. In this manner, the VoIP service provider can keep records of whether and when users confirmed their geographic location.

After the NMS 114 stores the user response (block 620), the geographic location change status updater 412 (FIG. 4) determines whether the user confirmed that the registered geographic location of the VoIP device 106 is the same as the current geographic location of the VoIP device 106 (block 622) (FIG. 6B) based on, for example, the user response requested at block 618. For example, the geographic location change status updater 412 determines that the registered geographic location of the VoIP device 106 is the same as the current geographic location if the user response confirmed (e.g., "Yes") that the registered geographic location of the VoIP device 106 is the same as the current geographic location. If the geographic location change status updater 412 determines that the geographic locations are not the same or after the user interface 406 informs the user that the VoIP device is within a location in which the VoIP service provider cannot provide E911 service (block 612), the user interface 406 presents a website uniform resource locator ("URL") address via the VoIP device (block 632) that the user can visit to provide updated geographic location information and/or to obtain more information on the messages presented by the user interface 406. Additionally or alternatively, the user interface 406 offers to connect the user to a customer service agent (block 634) at the customer service center 118 of FIG. 1. If the user elects to be connected to a customer service agent (block 636), then the user interface 406 connects the call to a customer service agent (block 638).

If at block 622, the geographic location change status updater 412 determines that the user confirmed that the geographic locations are the same, the operating mode selector 416 changes the VoIP device operating mode to the S0 (unrestricted) mode and the operating mode interface 414 stores the operating mode (block 640) in, for example, the feature server 130 of FIG. 1. The CSC 128 of FIG. 1 then completes the call (block 642). The example process of FIGS. 6A and 6B then returns control to a calling function or process and/or ends.

Figure 7:
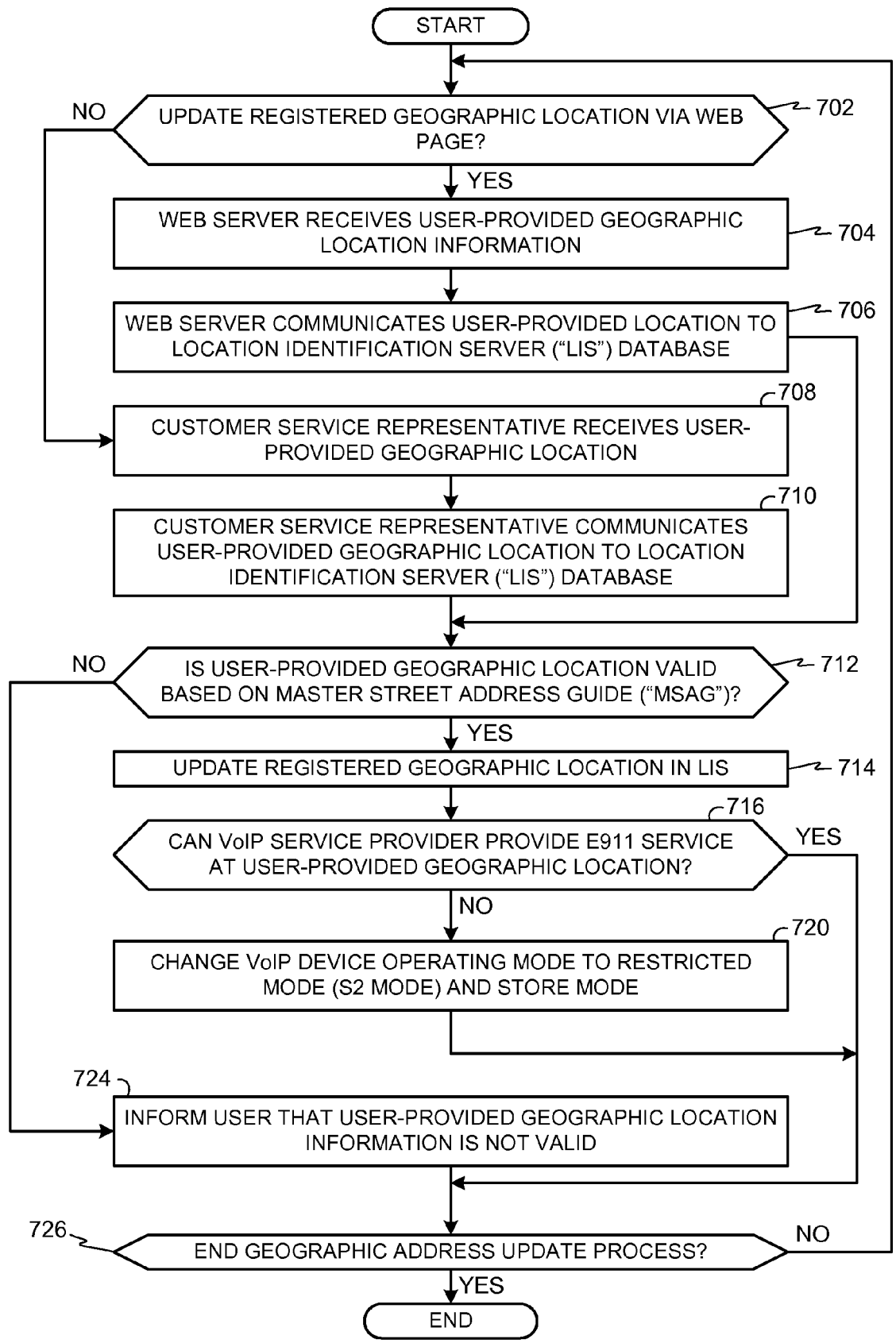
FIG. 7 is a flowchart representative of example machine readable instructions that may be executed to update a registered geographic location associated with a VoIP device.

FIG. 7 is a flowchart representative of example machine readable instructions that may be executed to update a registered geographic location associated with the VoIP device 106. Initially, if the user of the VoIP device 106 updates the registered geographic location via a web page (block 702), the web server 122 of FIG. 1 receives the user-provided geographic location information (block 704) such as, for example, a user-provided street address. The web server 122 then communicates the user-provided geographic location information to the LIS database 142 of FIG. 1.

If the user of the VoIP device 106 does not update the registered geographic location via a web page (block 702), and a customer service representative at the customer service center 118 receives the user-provided geographic location information (block 708) from the user of the VoIP device 106, the customer service representative communicates the user-provided geographic location information to the LIS database 142 (block 710).

After the LIS database 142 receives the user-provided geographic location information (block 706 or block 710), the validator 410 (FIG. 4) determines whether the user-provided geographic location information is MSAG-valid (i.e., valid) (block 712). In the illustrated example, the user-provided geographic location information is a street address that the validator 410 compares with addresses stored in the validation database ("VDB") 144 of FIG. 1 to determine if the user-provided street address is MSAG-valid. If the user-provided geographic location information is MSAG-valid (block 712), the geographic location information interface 408 updates the registered geographic location information in the LIS database 142 with the user-provided geographic location information (block 714).

The E911 service verifier 422 (FIG. 4) then determines whether the VoIP service provider of the VoIP device 106 can provide E911 service at the user-provided geographic location (block 716). If the VoIP service provider cannot provide E911 service at the user-provided geographic location (block 716), the NMS 114 instructs the operating mode selector 416 (FIG. 4) to change the operating mode associated with the VoIP device 106 to the S2 (restricted) mode and stores the restricted mode designator (block 720) in, for example, the feature server 130.

If the validator 410 determines that the user-provided geographic location information is not MSAG-valid (block 712), the web server 122 or the customer service representative assisting the user of the VoIP device 106 informs the user that the user-provided geographic location information (e.g., the street address) is not valid (block 724). The user must then provide another geographic location. In some cases, the geographic location information may not be MSAG-valid due to a typographical error, a missing zip code, or some other trivial mistake, and the user need merely re-type the geographic location information.

After informing the user that the user-provided geographic location information is invalid or after changing the operating mode associated with the VoIP device 106 to the S2 (restricted) mode and storing the restricted mode designator (block 720) or if the VoIP service provider can provide E911 service at the user-provided geographic location (block 716), the web server 122 or the customer service representative assisting the user of the VoIP device 106 then determines whether to end the geographic address update process (block 726). For example, the web server 122 may determine that it should end the process if the user of the VoIP device 106 has closed or logged out of the web page used to update the geographic location information, and/or the customer service representative may determine to end the process if the user has elected to end the call with the customer service representative. If the web server 122 or the customer service representative determines that the geographic location information update process should not end, then control is passed back to block 702. Otherwise, the process of FIG. 7 ends.

Figure 8:
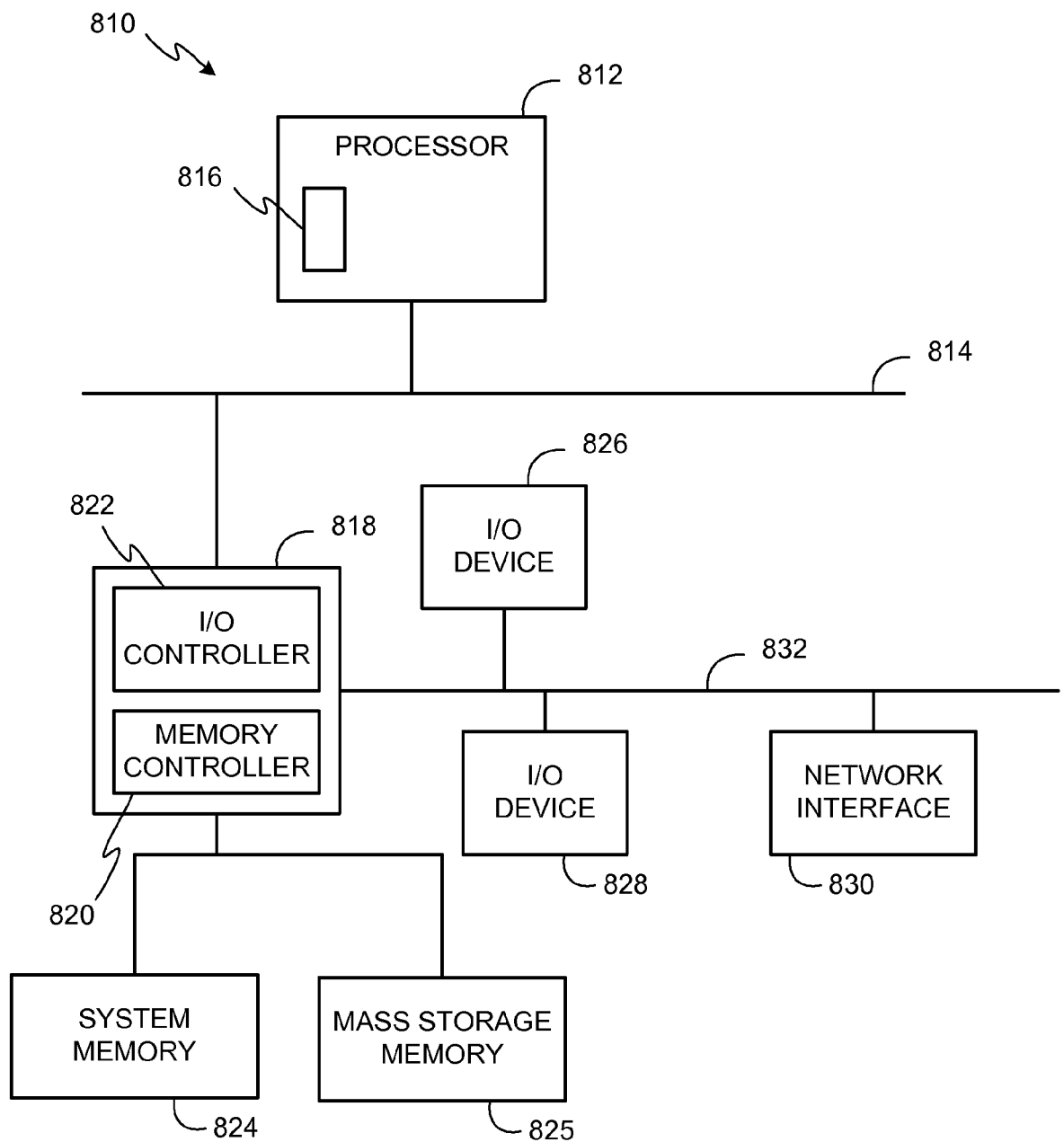
FIG. 8 is a block diagram of an example processor system that may be used to execute the example machine readable instructions of FIGS. 5, 6A, 6B, and/or 7 to implement the example system of FIG. 4.

FIG. 8 is a block diagram of an example processor system 810 that may be used to implement the example apparatus, methods, and articles of manufacture described herein. For example, processor systems substantially similar or identical to the example processor system 810 may be used to implement the site gateways 104a-b, the network management system 114, the HSS database 116, the web server 122, the IVR system 124, the emergency services gateway 132, the call session controller 128, the feature server 130, the LIS database 142, the validation database 144, and/or the VPC 148, the LAM database 154, the MSAG database 158, all shown in FIG. 1. In addition, processor systems substantially similar or identical to the example processor system 810 may be used to implement the IP address interface 402, the IP address comparator 404, the user interface 406, the geographic location information interface 408, the validator 410, the geographic location change status updater 412, the operating mode interface 414, the operating mode selector 416, the operating mode identifier 418, the call type identifier 420, the E911 service verifier 422, and/or the subscription services interface 424 of the example system 400 of FIG. 4. In addition, processor systems substantially similar or identical to the example processor system 810 may be used to implement the memory 1102, the subscriber access interface 1104, the service provider access interface 1106, the device registrar interface 1107, the validator 1108, the device configuration interface 1110, the current address update interface 1112, the scheduler 1114, the data record remover 1116, and/or the application server interface(s) 1118 of the example apparatus 1100 described below in connection with FIG. 11.

As shown in FIG. 8, the processor system 810 includes a processor 812 that is coupled to an interconnection bus 814. The processor 812 includes a register set or register space 816, which is depicted in FIG. 8 as being entirely on-chip, but which could alternatively be located entirely or partially off-chip and directly coupled to the processor 812 via dedicated electrical connections and/or via the interconnection bus 814. The processor 812 may be any suitable processor, processing unit or microprocessor. Although not shown in FIG. 8, the system 810 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and an input/output (I/O) controller 822. A chipset provides I/O and memory management functions as well as a plurality of general purpose and/or special purpose registers, timers, etc. that are accessible or used by one or more processors coupled to the chipset 818. The memory controller 820 performs functions that enable the processor 812 (or processors if there are multiple processors) to access a system memory 824 and a mass storage memory 825.

The system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device including hard disk drives, optical drives, tape storage devices, etc.

The I/O controller 822 performs functions that enable the processor 812 to communicate with peripheral input/output (I/O) devices 826 and 828 and a network interface 830 via an I/O bus 832. The I/O devices 826 and 828 may be any desired type of I/O device such as, for example, a keyboard, a video display or monitor, a mouse, etc. The network interface 830 may be, for example, an Ethernet device, an asynchronous transfer mode (ATM) device, an 802.11 device, a digital subscriber line (DSL) modem, a cable modem, a cellular modem, etc. that enables the processor system 810 to communicate with another processor system.

While the memory controller 820 and the I/O controller 822 are depicted in FIG. 8 as separate functional blocks within the chipset 818, the functions performed by these blocks may be integrated within a single semiconductor circuit or may be implemented using two or more separate integrated circuits.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above-described examples are not the only way to implement such systems.

FIG. 9 shows an example LAM database 154 storing geographic addresses 901, an example NMS 114 storing a geographic address list 902a, and an example VoIP device 106 storing a copy of the geographic address list 902b. In the illustrated example, the geographic addresses 901 form a plurality of geographic address lists, each of which corresponds to a particular subscriber account as described below in connection with FIG. 10. The LAM database 154 communicates the geographic addresses 901 corresponding to the VoIP device 106 to the NMS 114, and the NMS 114 stores the geographic addresses in the geographic address list 902a. In turn, the NMS 114 periodically or aperiodically communicates the geographic addresses in the geographic address list 902a to the VoIP device 106.

The VoIP device 106 includes the SIP UA 214 described above in connection with FIG. 2 to implement a SIP registration process. The VoIP device 106 also includes a memory 904 in which the VoIP device 106 stores the geographic addresses in the geographic address list 902b. The LAM database 154 is configured to communicate the geographic addresses 901 corresponding to different subscribers to the NMS 114 after the geographic addresses are provided to the LAM database 154 and validated as MSAG-valid. The NMS 114 is configured to communicate geographic address update information to the VoIP device 106 when a geographic address corresponding to the account of the VoIP device 106 is changed, deleted from, or added in the LAM database 154. In some example implementations, the geographic address list 902b is stored in a device configuration file (not shown) in the memory 904 of the VoIP device 106. In the illustrated example, a device configuration file is used in connection with registering the VoIP device 106 with the IMS 112 using, for example, a session initiation protocol ("SIP") registration process. Alternatively, the geographic address list 902b can be stored in a file separate from the device configuration file.

In the illustrated example, the VoIP device 106 includes an update interface 912 configured to request geographic address updates from the NMS 114. For example, the update interface 912 is configured to periodically or aperiodically request geographic address updates from the NMS 114. The NMS 114 responds by communicating one or more (if any) geographic addresses from the list 902a to the VoIP device 106.

After the VoIP device 106 receives and stores one or more geographic addresses in the geographic address list 902b and the VoIP device 106 has been moved to a different location, the VoIP device 106 can present the one or more geographic addresses from the geographic address list 902b to a user. For example, as shown in FIG. 9, the VoIP device 106 includes a display 906 configured to display information. In the illustrated example, the VoIP device 106 is configured to present an address selection screen 908 having a plurality of geographic addresses 910 from the geographic address list 902b that are available for selection by a user as the current geographic address at which the VoIP device 106 is being used. The user may provide a user-selection via a user interface 916, which may be implemented using one or more buttons, one or more dials, a touchscreen interface, and/or any other interface.

To communicate a current address selection to the LAM database 154, the VoIP device 106 is provided with a network interface 914. The network interface 914 may be implemented using a hypertext transfer protocol over secure socket layer ("HTTPS") interface to enable the VoIP device to access the LAM database 154 securely via the Internet and/or the NMS 114. After the network interface 914 communicates the selected geographic address to the LAM database 154, the LAM database 154 can set the geographic address stored therein as the current address for the VoIP device 106.

Figure 10:
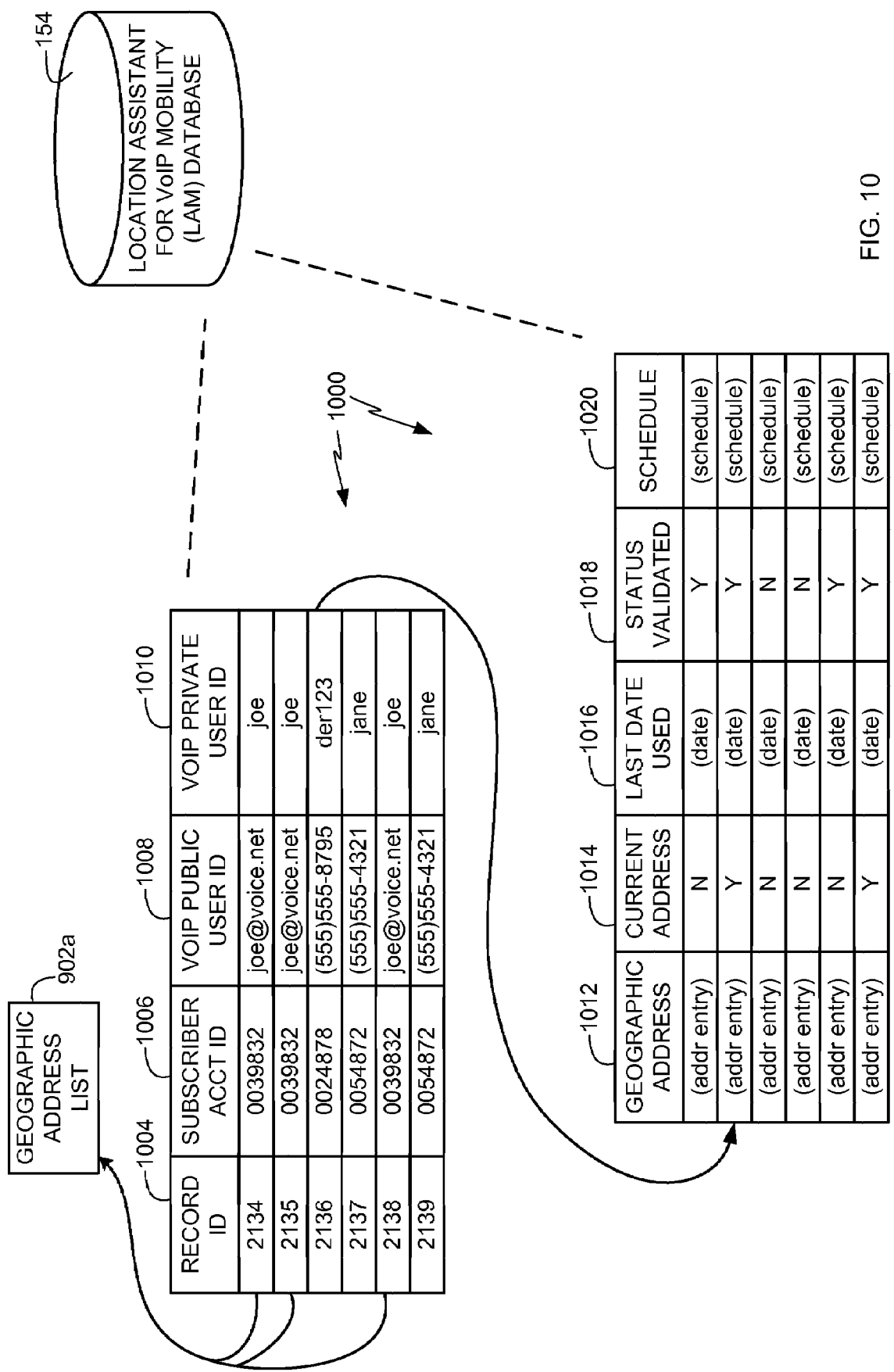
FIG. 10 depicts an example geographic address data structure configured to store the geographic addresses in the example LAM database of FIG. 9 corresponding to a plurality of VoIP subscriber accounts.

FIG. 10 depicts an example geographic address data structure 1000 configured to store the geographic addresses 901 (FIG. 9) that form a plurality of address lists corresponding to a plurality of VoIP subscriber accounts in the LAM database 154. In the illustrated example, the LAM database 154 is configured to store information corresponding to a record ID column 1004, a subscriber account ID column 1006, a VoIP public user ID column 1008, a VoIP private user ID column 1010, a geographic address column 1012, a current address column 1014, a last date used column 1016, a status validated column 1018, and a schedule column 1020. In other example implementations, the example geographic address data structure 1000 may include fewer or more columns and/or types of information.

In the illustrated example, the record ID column 1004 indicates the record number for a particular data record in the data structure 1000. The subscriber account ID column 1006 indicates the account ID of the subscriber to which a particular entry corresponds. The plurality of address lists stored in the data structure 1000 are identified by the subscriber account ID's. That is, an address list corresponding to a particular subscriber includes the geographic addresses stored in the data structure in association with the account ID of that particular subscriber.

The VoIP public user ID column 1008 stores PUID's (e.g., PUID's such as the PUID's 310 of FIG. 3) assigned to subscriber accounts. The VoIP private user ID column 1010 stores VoIP private user ID's. A VoIP user ID is a private identifier that is assigned to a user subscription associated with a VoIP device 106 by a home network operator that provides VoIP services. The VoIP user ID can be used for registration, authorization, administration, and accounting purposes. The geographic address column 1012 stores geographic addresses provided by subscribers. In the illustrated example, one geographic address is stored in each data record of the data structure 1000.

The current address column 1014 stores YES/NO flag values to indicate whether geographic addresses stored in the geographic address column 1012 are set as a current address. In the illustrated example, setting a flag value in the current address column 1014 to YES for a particular data record triggers an update process to update the current address for a corresponding VoIP device in the LIS database 142 of FIG. 1. In this manner, the LIS database 142 has the current geographic address at which a VoIP device is being used, and the LIS database 142 can use the geographic address to provide current address information for use with E911 emergency services.

For each data record, the last date used column 1016 stores a most recent date on which a corresponding geographic address was set as the current address. For each data record, the status validated column 1018 stores a YES/NO flag value to indicate whether a corresponding geographic address has been validated to be MSAG-valid. As shown, some data records contain a NO flag value in the status validated column 1018 to indicate that the corresponding addresses have not been validated or are not valid. The data structure 1000 is configured to store the invalid data records to allow users to access the addresses to correct, replace, or delete the addresses.

In the illustrated example, the schedule column 1020 stores schedule information that indicates subscriber-provided days and/or times on which corresponding geographic addresses should be automatically set to current addresses. That is, the schedule column 1020 enables a subscriber to configure the LAM database 154 to automatically select a geographic address as a current address for the VoIP device 106 of that subscriber. For example, if the subscriber has a recurring traveling schedule to the same geographic locations, instead of manually selecting a current geographic address each time the subscriber registers the VoIP device 106 at one of the different geographic locations, the subscriber can provide scheduled dates and/or date ranges that are stored in the schedule column 1020 and elect to have the LAM database 154 automatically select current addresses based on the provided schedule information.

In the illustrated example of FIG. 10, when a subscriber provides a new geographic address, a new data record is created in the data structure 1000 and the account ID of that subscriber is stored in the subscriber account ID column 1006 for the new data record. To generate the geographic address list 902a, the LAM database 154 is configured to search the data structure 1000 for data records associated with the subscriber account ID corresponding to the VoIP device 106 and compile the geographic address entries from those data records into the geographic address list 902a.

Figure 11:
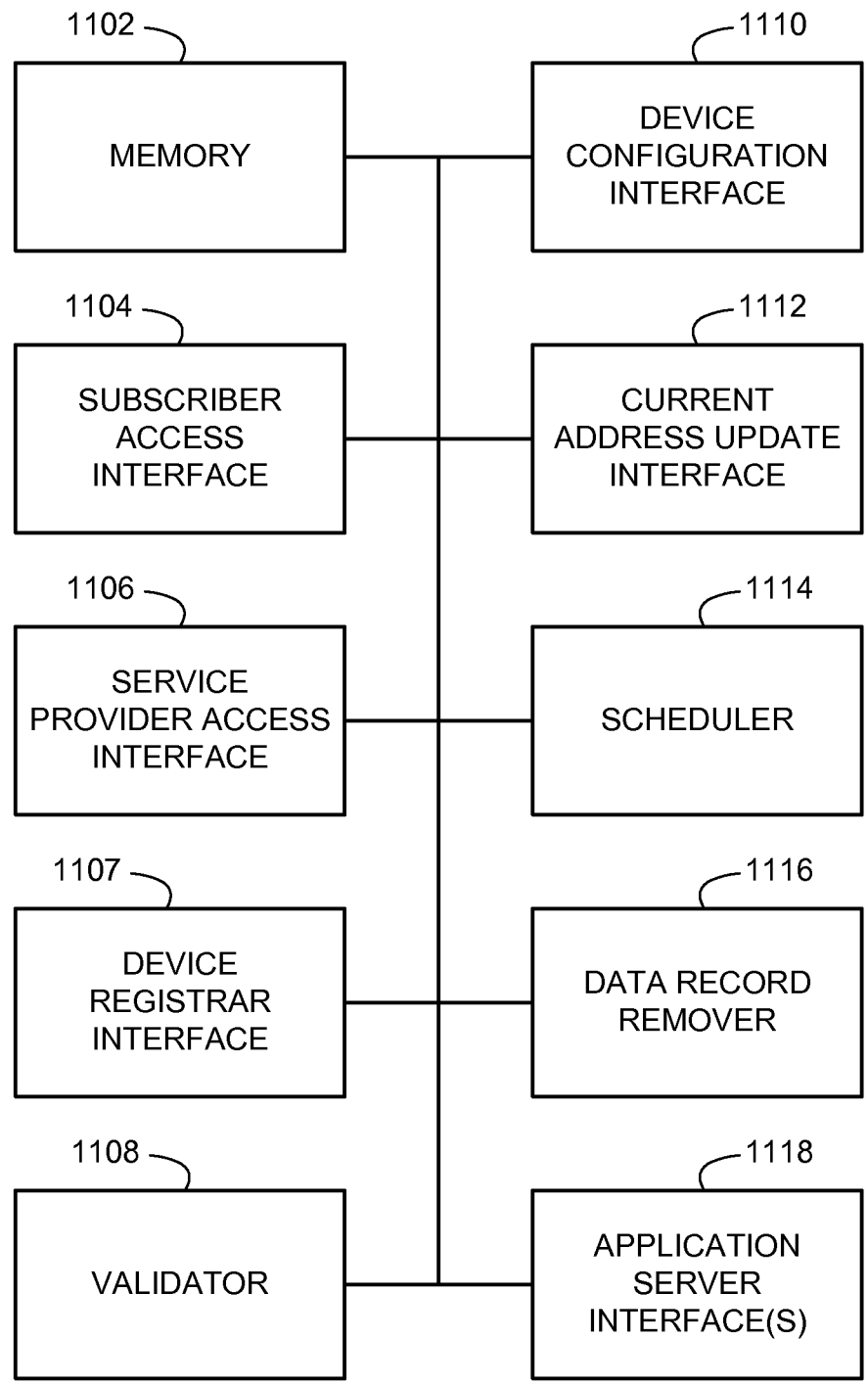
FIG. 11 is an example apparatus that can be used to implement the example LAM database of FIGS. 9 and 10.

FIG. 11 illustrates an example apparatus 1100 that can be used to implement the example LAM database 154 of FIGS. 1, 9, and 10. The example apparatus 1100 includes a memory 1102, a subscriber access interface 1104, a service provider access interface 1106, a device registrar interface 1107, a validator 1108, a device configuration interface 1110, a current address update interface 1112, a scheduler 1114, a data record remover 1116, and one or more application server interface(s) 1118, all of which may be implemented using any desired combination of hardware, firmware, and/or software. For example, one or more integrated circuits, discrete semiconductor components, or passive electronic components may be used. Additionally or alternatively, some or all of the blocks of the example apparatus 1100, or parts thereof, may be implemented using instructions, code, and/or other software and/or firmware, etc. stored on a machine accessible medium that, when executed by, for example, a processor (e.g., the example processor system 810 of FIG. 8), perform the operations represented in the flow diagrams of FIGS. 12-14.

To store data records substantially similar to the data records described above in connection with FIG. 10, the example apparatus 1100 is provided with the memory 1102. The memory 1102 is configured to store data records including the geographic addresses 901 of FIG. 9. The memory 1102 may be implemented using, for example, any magnetic, optical, or solid-state mass storage device.

To enable subscribers to access the information stored in the memory 1102, the example apparatus 1100 is provided with the subscriber access interface 1104. In the illustrated example, the subscriber access interface 1104 is configured to enable subscribers to add, remove, and/or modify geographic addresses; select geographic addresses as current addresses; and/or set scheduling information. The subscriber access interface 1104 can be implemented using a hypertext transfer protocol over secure socket layer ("HTTPS") interface to enable subscribers to access the LAM database 154 securely via the Internet. In some example implementations, the subscriber access interface 1104 is implemented in connection with the web server 122 of FIG. 1 to provide access to the LAM database 154 via a web page interface. In the illustrated example, the subscriber access interface 1104 is also configured to provide customer service agents with access to the LAM database 154.

To enable VoIP service provider personnel or customer service agents to access the information stored in the memory 1102, the example apparatus 1100 is provided with the service provider access interface 1106. In the illustrated example, the service provider access interface 1106 is configured to enable VoIP service provider personnel or customer service agents to add, remove, and/or modify geographic addresses; select geographic addresses as current addresses; set scheduling information; and/or to change any other information in the LAM database 154. In the illustrated example, the service provider access interface 1106 is configured to provide access to the LAM database 154 from within a private network (e.g., an intranet, a secure network, etc.) of the VoIP service provider. The service provider access interface 1106 may be implemented in connection with, for example, an intranet web server to provide access via an intranet web page. In some example implementations, the service provider access interface 1106 may also be configured to enable network operators to access the LAM database to perform routine system administration tasks.

To enable the device registrar of the CSC 128 (FIG. 1) to access the information stored in the memory 1102 during a SIP registration process, the example apparatus 1100 is provided with the device registrar interface 1107. In the illustrated example, the device registrar interface 1107 is configured to enable subscribers to select geographic addresses as current addresses during a SIP registration process. A SIP registration process is configured to complete registration or deny registration within a particular amount of time so that a user is not made to wait an excessive amount of time before knowing whether the VoIP device 106 has or has not been registered. In the illustrated example, the device registrar interface 1107 is configured to exchange information related to updating current addresses with the CSC 128 in real-time to meet the time requirements and constraints of a SIP registration process. The device registrar interface 1107 can be implemented using a Java application programming interface (API) or any other API.

To validate user-provided geographic addresses, the example apparatus 1100 is provided with the validator 1108. In the illustrated example, the validator 1108 is configured to determine whether user-provided geographic addresses are MSAG-valid based on, for example, address information stored in the MSAG database 158 of FIG. 1. For example, if the validator 1108 finds a street address stored in the MSAG database 158 to match a user-provided geographic address, then the validator 1108 indicates the user-provided geographic address is valid by setting a YES value in the status validated column 1018 (FIG. 1) for a corresponding data record. In the illustrated example, if a geographic address has not been validated, it cannot be used as a current address in the LIS database 142 for use with E911 service.

To enable the LAM database 154 to communicate validated geographic addresses for subscribers to the NMS 114, the example apparatus 1100 is provided with the device configuration interface 1110. In the illustrated example, the device configuration interface 1110 can search the data structure(s) 1000 stored in the LAM database 154 for data records associated with the subscriber account ID corresponding to a VoIP device 106 of interest, compile the geographic address entries from those data records into a geographic address list 902*a*, and communicate the geographic address list 902*a* to the NMS 114. Alternatively, the device configuration interface 1110 can communicate the geographic address entries to the NMS 114 and the NMS 114 can generate the geographic address list 902*a*. The NMS 114 can communicate updates to the geographic address list 902*a* to the VoIP device 106. In the illustrated example, when the VoIP device 106 is booted up it checks with the NMS 114 for any configuration updates and to determine whether the geographic address list 902*a* has changed relative to a geographic address list stored in the VoIP device 106. If the geographic address list 902*a* stored in the NMS 114 is different from the geographic address list 902*b* stored in the VoIP device 106, the NMS 114 communicates the updated geographic addresses to the VoIP device 106. In this manner, the VoIP device 106 can ensure that it has the latest configuration file and geographic address list that includes all of the updated geographic address records from LAM database 154.

To trigger a current address update process to update a current address in the LIS database 142 (FIG. 1), the example apparatus 1100 of FIG. 11 is provided with a current address update interface 1112. In the illustrated example, the current address update interface 1112 is configured to detect when a geographic address entry is set to a current address in the current address column 1014 of the data structure 1000 (FIG. 10). In response to detecting a setting of a current address, the current address update interface 1112 is configured to automatically trigger an address update process to update the geographic address entry associated with a corresponding VoIP device and/or subscriber account in the LIS database 142. In this manner, the LIS database 142 is automatically updated to include the current geographic address at which a VoIP device is being used, and the LIS database 142 can use the geographic address to provide current address information for use with, for example, E911 emergency services.

To automatically set a geographic address in the LAM database 154 as a current address, the example apparatus 1100 is provided with a scheduler 1114. The scheduler 1114 is configured to retrieve scheduling information stored in the schedule column 1020 of the data structure 1000 (FIG. 10) and automatically set a geographic address in the data structure 1000 as the current address for a given VoIP device based on the corresponding schedule information.

To remove geographic address records from the LAM database 154, the example apparatus 1100 is provided with a data record remover 1116. In the illustrated example, the data record remover is configured to search the data structure 1000 (FIG. 10) for data record(s) that have not recently been used as a current address and to delete those data records as stale. For example, the data record remover 1116 can be provided with a threshold value specifying a quantity of days within which a data record must have been set as a current address. Any records that have not been set as a current address within the quantity of days threshold are removed by the data record remover 1116. In this manner, memory space in the LAM database 154 can be reallocated to store new data records by deleting old data records which may have contained geographic addresses that were only visited once by a subscriber or that a subscriber is not likely to visit again or to visit in the near future.

To enable one or more application servers of a VoIP service provider to access the LAM database 154, the example apparatus 1100 is provided with one or more application server interfaces 1118. In addition to being used in connection with providing location-based emergency services (e.g., E911 services) to users of VoIP devices, the LAM database 154 can also be used in connection with other location-based services provided by VoIP service providers. For example, based on a current geographic address set in the LAM database 154 for a particular subscriber, a VoIP service provider can communicate location-specific information of interest to the VoIP device 106 of the subscriber including, for example, location-specific advertisements, nearby points of interest, location-specific weather information, or any other location-based information. The application server interface(s) 1118 can be implemented using a secure access interface (e.g., an HTTPS interface) to enable application servers to access the information in the LAM database 154 securely.

Figure 12:
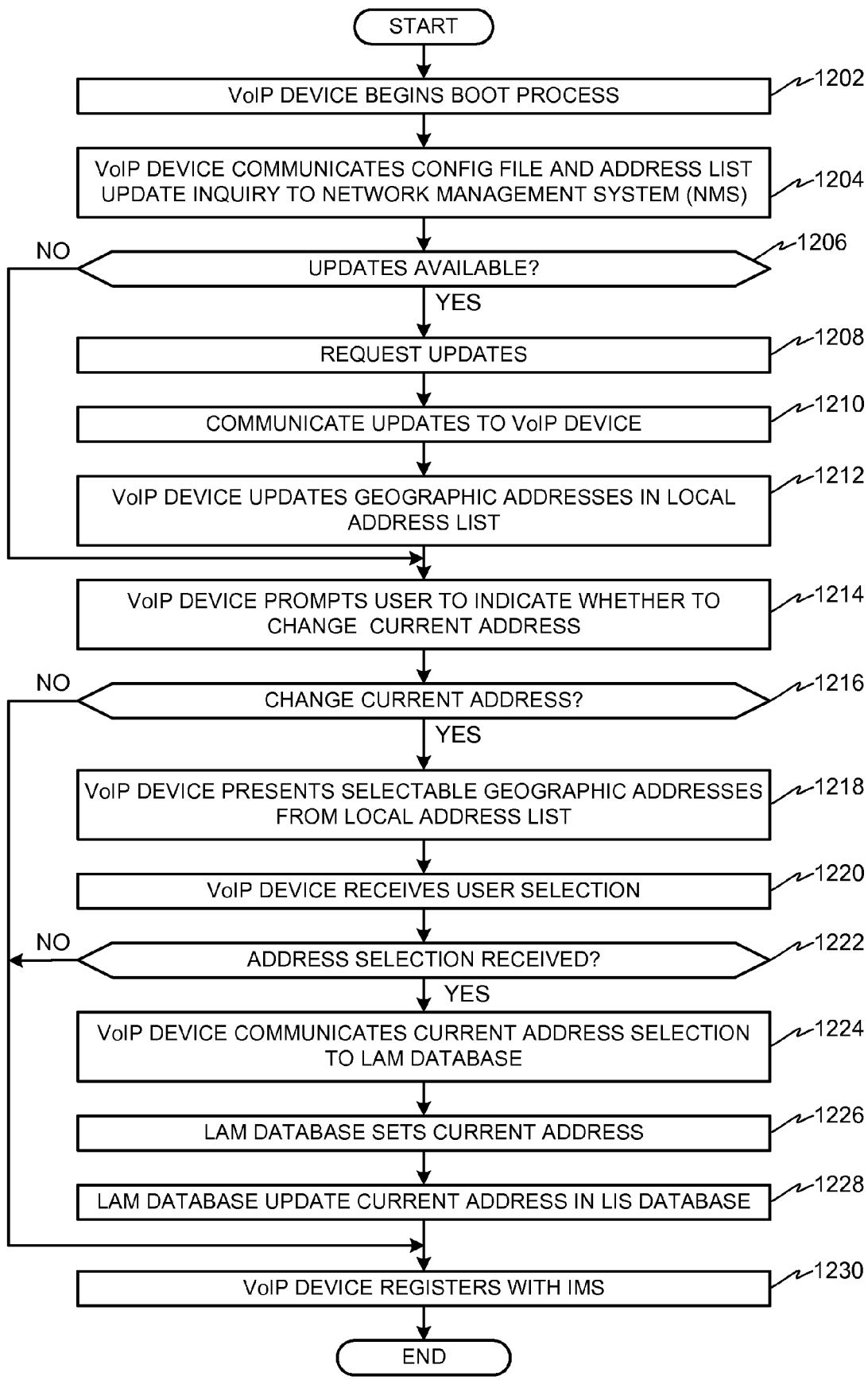
FIG. 12 is a flowchart representative of example machine readable instructions that may be executed to update a geographic address list of FIG. 9 in a VoIP device and change a current address registered in the database of FIGS. 9 and 10 prior to a registration process of the VoIP device.
Figure 13A:
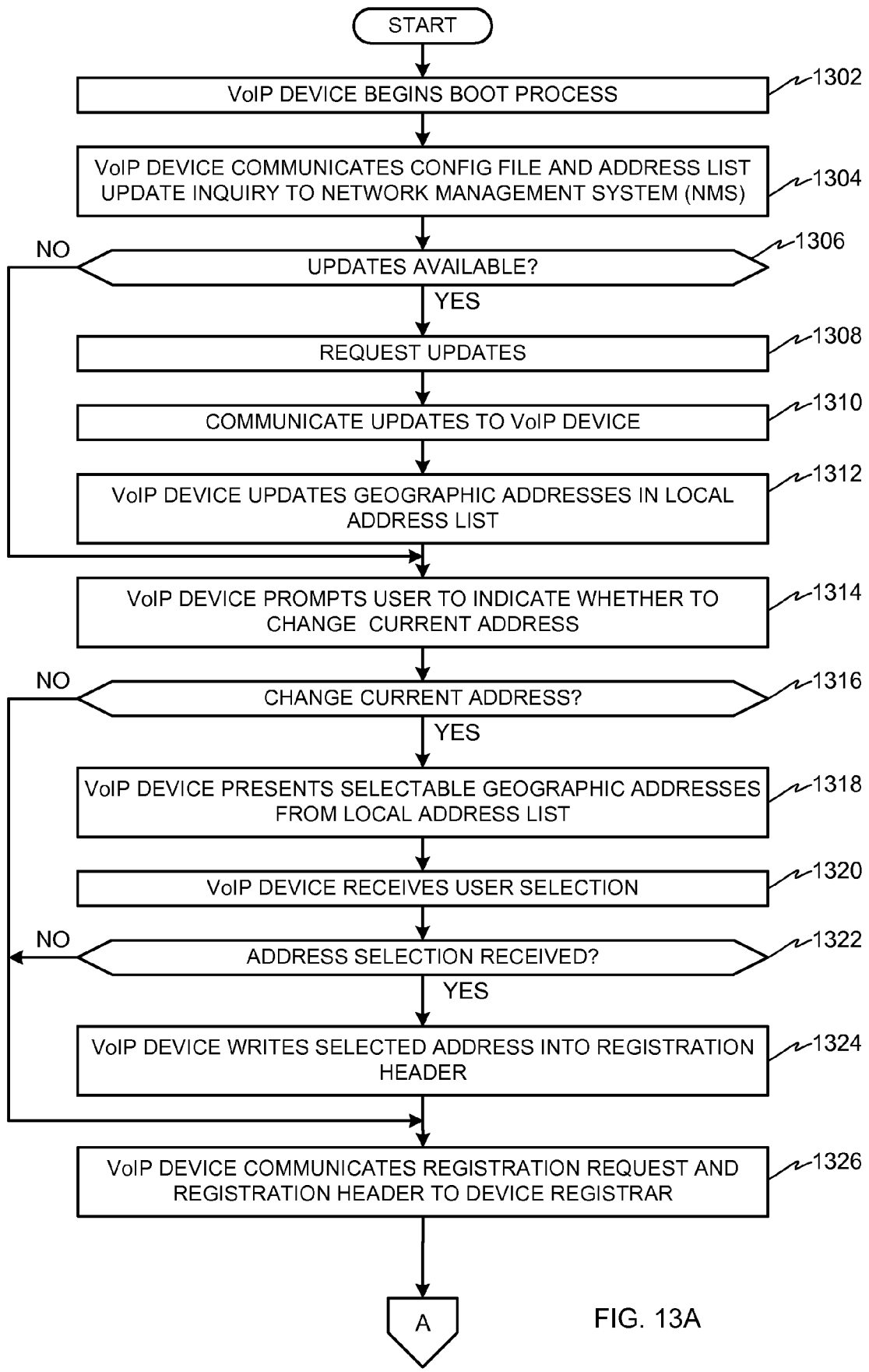
FIGS. 13A-13B depict a flowchart representative of example machine readable instructions that may be executed to update the geographic address list of FIG. 9 in the VoIP device prior to a network registration process and to update a current address registered in the database of FIG. 9 during the network registration process.
Figure 13B:
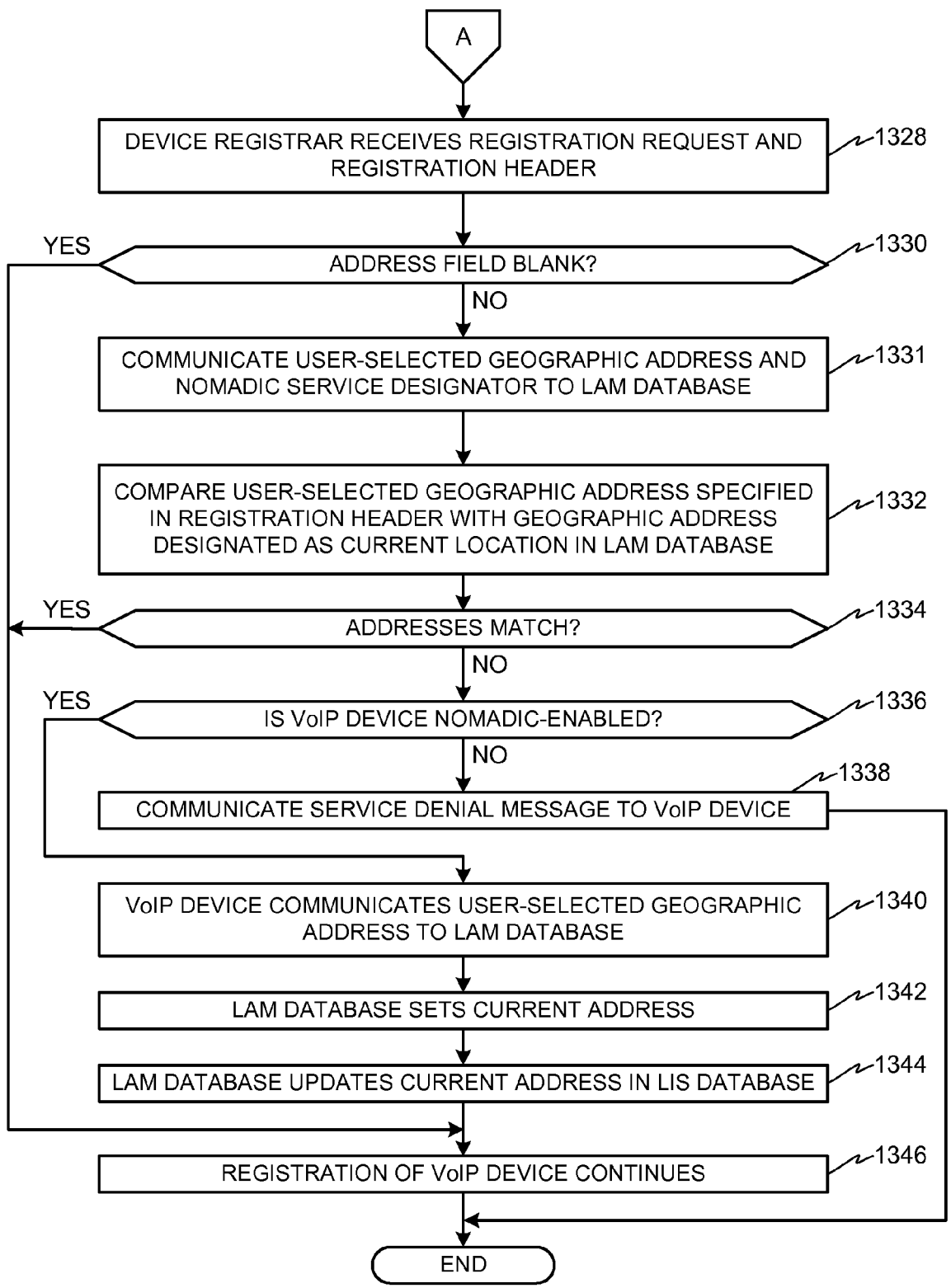
Figure 14:
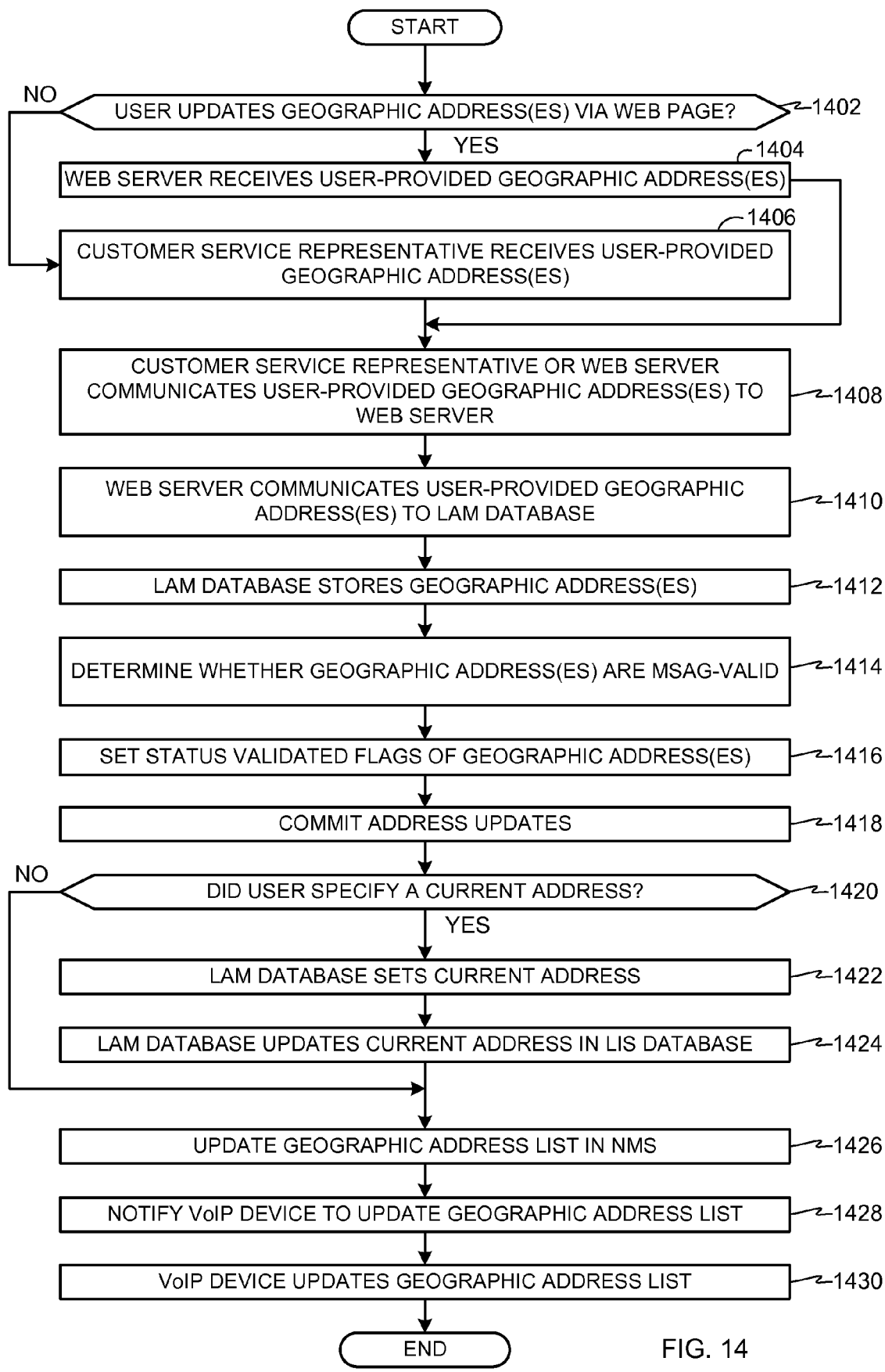
FIG. 14 is a flowchart representative of example machine readable instructions that may be executed to update geographic addresses in the geographic address lists of FIG. 9 and to update a current address registered in the database of FIGS. 9 and 10 using a web portal.

FIGS. 12-14 are flowcharts representative of example machine readable instructions that may be executed to implement the system of FIG. 9 and/or more generally to detect geographic location changes of VoIP devices and/or to update geographic addresses associated with VoIP devices. Although the example machine readable instructions are described with reference to the flowcharts of FIGS. 12-14, persons of ordinary skill in the art will readily appreciate that other methods of detecting geographic location changes and updating geographic addresses and/or implementing the example VoIP device 106 of FIGS. 1, 2, and 10, the example system 400 of FIG. 4, and/or the example apparatus 1100 of FIG. 11 may additionally or alternatively be used. For example, the order of execution of the blocks depicted in the flowcharts of FIGS. 12-14 may be changed, and/or some of the blocks described may be rearranged, eliminated, or combined.

FIG. 12 is a flowchart representative of example machine readable instructions that may be executed to update the geographic address list 902b (FIG. 9) in the VoIP device 106 and change the current address registered in the LAM database 154 prior to a registration process of the VoIP device 106. Initially, when the VoIP device 106 is powered on or reset, the VoIP device 106 begins a boot process (block 1202) and the update interface 912 (FIG. 9) of the VoIP device 106 communicates a configuration file and address list update inquiry message to the NMS 114 (FIGS. 1 and 9) (block 1204). The VoIP device 106 communicates the update inquiry message to verify whether the device configuration file and/or the address list 902b stored in the VoIP device 106 include the same information as the device configuration file and/or the address list 902a stored in the NMS 114 or whether the device configuration file and/or the address list 902b stored in the VoIP device 106 should be updated. In the illustrated example, the inquiry message may include a request for a timestamp of the device configuration file and/or the address list 902a stored in the NMS 114.

The VoIP device 106 can then determine whether updates are available (block 1206) for the device configuration file and/or the geographic address list 902b stored in the VoIP device 106 by comparing the timestamp received from the NMS 114 to the timestamp of the device configuration file and/or the address list 902b stored in the VoIP device 106. If the VoIP device 106 determines that the configuration file and/or the geographic address list 902b require updates (block 1206), the VoIP device 106 requests the updates from the NMS 114 (block 1208). The NMS 114 then communicates the updates to the VoIP device 106 (block 1210) for the configuration file and/or the geographic address list 902b. For example, to communicate one or more updates to the geographic address list 902b, the NMS 114 communicates one or more geographic addresses from the geographic list 902a to the VoIP device 106 that the NMS 114 received from the device configuration interface 1110 of the LAM database 154 and that are not already stored in the geographic address list 902b in the VoIP device 106. In this manner, during an update, the NMS 114 is configured to communicate at least a partial copy of the geographic address list 902a for storage in the geographic address list 902b. The transmitted copy includes one or more geographic addresses that are not already stored in the geographic address list 902a. In some example implementations, the NMS 114 may also communicate instructions or commands to the update interface 912 of the VoIP device 106 to delete one or more geographic addresses from the geographic address list 902b that have been removed from the LAM database 154 and/or the geographic address list 902a in the NMS 114.

After the VoIP device 106 receives the update from the NMS 114, the update interface 912 updates one or more geographic addresses in the locally stored geographic address list 902b (block 1212). For example, the update interface 912 can add a geographic address received from the NMS 114, delete a geographic address indicated by the NMS 114, or change a geographic addresses indicated by the NMS 114. Alternatively, the update interface 912 can overwrite the locally stored geographic address list 902b with a new geographic address list received from the NMS 114.

After the VoIP device 106 updates the geographic address list 902b (block 1212) or if the NMS 114 determines that the VoIP device 106 does not require an update to the configuration file and/or the geographic address list 902b (block 1206), the VoIP device 106 prompts a user to indicate whether to change a current address designation (block 1214). For example, the VoIP device 106 can present a text message via the display 906 (FIG. 9) requesting the user to indicate whether the user would like to set a different current address.

The VoIP device 106 then determines whether the user would like to change a current address designation (block 1216) based on a user-provided response to the question presented in connection with block 1214. If the user-provided response indicates the user would like to change a current address (block 1216), the VoIP device 106 presents one or more selectable geographic addresses from the locally stored geographic address list 902b (block 1218). For example, the VoIP device 106 can present the list of geographic addresses via the display 906 using a screen substantially similar or identical to the address selection screen 908 of FIG. 9.

The VoIP device 106 then receives a user selection (block 1220) and determines whether the user selection includes a selection of a geographic address (block 1222). For example, if the user selected one of the presented geographic addresses, then the user selection will include a selection specifying the selected geographic address. On the other hand, if the geographic address of the location at which the user is located is not stored in the geographic address list 902b, the user may elect not to select one of the presented geographic addresses and instead cancel the address selection screen 908. If the user does not select a geographic address, the user can update the current geographic address designation via other methods including the example techniques described above in connection with the flowcharts of FIGS. 6A, 6B, and 7.

If the VoIP device 106 determines that the received user selection includes a selection of a geographic address (block 1222), the network interface 914 communicates the current address selection to the LAM database 154 (block 1224), and the LAM database 154 sets the current address in the data structure 1000 of FIG. 10 (block 1226). For example, the LAM database 154 can set the current address for the VoIP device 106 by setting the flag value to YES in the current address column 1014 for the data record corresponding to the selected geographic address and the subscriber account for the VoIP device 106. The LAM database 154 also sets the flag value of a previous current address to NO.

When the current address update interface 1112 (FIG. 11) of the LAM database 154 detects that the current address has changed, the current address update interface 1112 triggers a current address update in the LIS database 142 (block 1228). In this manner, the LIS database 142 is updated to store a current geographic address associated with the VoIP device 106 for use with E911 emergency services.

After the current address update interface 1112 of the LAM database 154 triggers the current address update in the LIS database 142 (block 1228) or if the VoIP device 106 determines that the user selection does not include a geographic address selection (block 1222) or if the user elected not to change a current address selection (block 1216), the VoIP device 106 registers with the IMS 112 (block 1230) by, for example, initiating a SIP registration process. After the VoIP device 106 registers with the IMS 112, the process of FIG. 12 ends. In addition, when the user places a call using the VoIP device 106, the processes described above in connection with the flowcharts of FIGS. 5, 6A, and 6B can be implemented to detect whether the VoIP device 106 has changed locations and/or to confirm that the geographic address designated as the current address in the LAM database 154 and the LIS database 142 is the geographic address of the location at which the user is using the VoIP device 106.

FIGS. 13A-13B depict a flowchart representative of example machine readable instructions that may be executed to update the geographic address list 902b (FIG. 9) in the VoIP device 106 prior to a network registration process and to update a current address registered in the LAM database 154 during the network registration process. The operations of blocks 1302, 1304, 1306, 1308, 1310, 1312, 1314, 1316, 1318, and 1320 are substantially similar or identical to operations of respective ones of the blocks 1202, 1204, 1206, 1208, 1210, 1212, 1214, 1216, 1218, and 1220 of FIG. 12 and, thus, will not be described in detail below. Instead, the interested reader is referred back to the above description of FIG. 12 for a complete written description of this portion of FIG. 13A.

Figure 15:
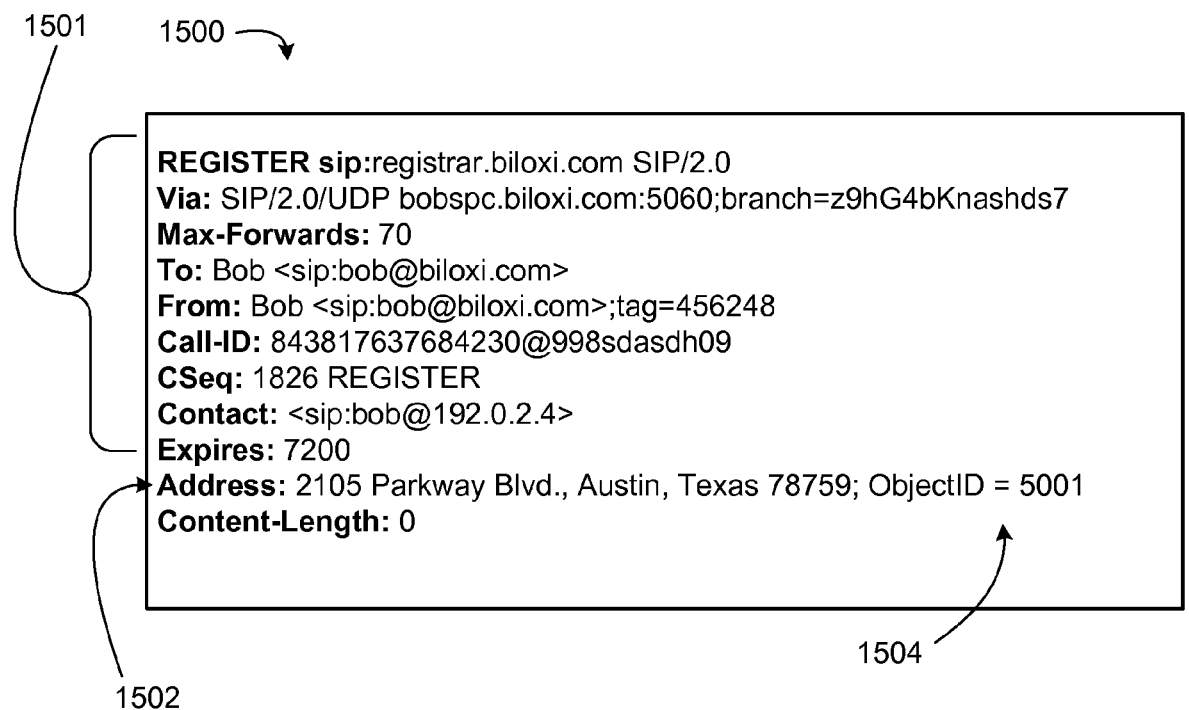
FIG. 15 shows an example session initiation protocol ("SIP") registration header that can be used to register a VoIP device with a VoIP network.

Picking up the discussion at block 1320 of FIG. 13A, after the VoIP device 106 receives the user selection (block 1320), the VoIP device 106 determines whether the user selection includes a selection of a geographic address (block 1322) from the address selection screen 908 (FIG. 9). If the VoIP device 106 determines that the received user selection includes a selection of a geographic address, the SIP UA 214 (FIG. 2) of the VoIP device 106 writes the selected geographic address into a registration header (block 1324). An example SIP registration header 1500 is shown in FIG. 15. In the illustrated example, the SIP registration header 1500 includes a plurality of fields 1501 configured to store information associated with registering the VoIP device 106 with the IMS 112. In addition, the SIP registration header 1500 includes a geographic address field 1502 configured to store a current geographic address selected by a user and that the SIP UA 214 writes into the geographic address field 1502. The SIP registration header 500 also includes an object ID 1504 that is used to store a record ID associated with the selected current geographic address in the geographic address field 1502. Specifically, the object ID 1504 corresponds to a record ID (in the record ID column 1004 of FIG. 10) stored in the LAM database 154 for the geographic address written in the geographic address field 1502. If the VoIP device 106 determines that the user selection does not include a selection of a geographic address (block 1322), control advances directly from block 1322 to block 1326 without passing through block 1324 such that the VoIP device 106 does not write a geographic address into the geographic address field 1502 and the SIP registration of the VoIP device 106 continues with a blank geographic address field 1502.

After the SIP UA 214 writes the selected geographic address into the registration header 1500 (block 1334), or if the VoIP device 106 determines that the user selection does not include a selection of a geographic address (block 1322), or if the user elected not to change a current address selection (block 1316), the VoIP device 106 communicates a registration request and the registration header 1500 to the device registrar of the CSC 128 (FIG. 1) (block 1326). When the device registrar of the CSC 128 receives the registration request and the registration header 1500 (block 1328) (FIG. 13B) via, for example, a registration request interface, the CSC 128 determines whether the information received from the geographic address field 1502 is blank (block 1330) by, for example, comparing the geographic address field 1502 information with a null value using the comparator 426 (FIG. 4).

If the CSC 128 determines that the geographic address field 1502 is not blank (block 1330), the device registrar in the CSC 128 communicates the geographic address from the geographic address field 1502 and a nomadic service designator 317 (FIG. 3) corresponding to the subscriber of the VoIP device 106 to the device registrar interface 1107 of the LAM database 154 (block 1331). A comparator of the device registrar interface 1107 compares the user-selected geographic address specified in the geographic address field 1502 with a geographic address designated as a current location for the VoIP device 106 in the LAM database 154 (block 1332) and determines whether these two geographic addresses match (block 1334). If the device registrar interface 1107 determines that the geographic addresses do not match (block 1334), the device registrar interface 1107 determines whether the VoIP device 106 is nomadic-enabled (block 1336) by, for example, checking the value of the nomadic service designator 317 corresponding to the VoIP device 106. If the device registrar interface 1107 determines that the VoIP device 106 is not eligible for nomadic use (block 1336), the device registrar interface 1107 communicates a notification to the CSC 128 directing the device registrar of the CSC 128 to deny registration of the VoIP device 106, and the device registrar of the CSC 128 communicates a service denial message to the VoIP device 106 (block 1338). The process of FIGS. 13A and 13B then ends.

If the device registrar interface 1107 determines that the VoIP device 106 is eligible for nomadic use (block 1336), the device registrar interface 1107 communicates the user-selected geographic address from the geographic address field 1502 to the LAM database 154 (block 1340). The LAM database 154 then sets the current address in the data structure 1000 (FIG. 10) (block 1342). For example, the LAM database 154 can set the current address for the VoIP device 106 by setting the flag value to YES in the current address column 1014 for the data record corresponding to the selected geographic address of the subscriber account for the VoIP device 106. The LAM database 154 also sets the flag value of a previous current address to NO.

When the current address update interface 1112 (FIG. 11) of the LAM database 154 detects that the current address has changed, the current address update interface 1112 triggers a current address update in the LIS database 142 (block 1344). In this manner, the LIS database 142 is updated to store a current geographic address associated with the VoIP device 106 for use with E911 emergency services.

After the current address update interface 1112 of the LAM database 154 triggers the current address update in the LIS database 142 (block 1344), or if the device registrar interface 1107 determines that the geographic address from the registration header 1500 matches the current address in the LAM database 154 (block 1334), or if the geographic address comparator 426 determines that the geographic address field 1502 of the registration header 1500 is blank (block 1330), the registration of the VoIP device 106 with the IMS 112 continues (block 1346) so that the SIP registration of the VoIP device 106 can be completed. After the VoIP device 106 registers with the IMS 112, the process of FIGS. 13A and 13B ends. In addition, when the user places a call using the VoIP device 106, the processes described above in connection with the flowcharts of FIGS. 5, 6A, and 6B can be implemented to detect whether the VoIP device 106 has changed locations and to confirm that the geographic address designated as the current address in the LAM database 154 and the LIS database 142 is the geographic address of the location at which the user is currently using the VoIP device 106.

FIG. 14 is a flowchart representative of example machine readable instructions that may be executed to update geographic addresses in the geographic address lists 902a and 902b (FIG. 9) and to update a current address registered in the LAM database 154 using the web server 122 (FIG. 1). Initially, if the user of the VoIP device 106 provides one or more geographic addresses via a web page (block 1402), the web server 122 of FIG. 1 receives the user-provided geographic address(es) (block 1404). If the user of the VoIP device 106 does not provide geographic address(es) via a web page (block 1402), but instead the user calls a customer service number, a customer service representative at the customer service center 118 (FIG. 1) receives the user-provided geographic address(es) (block 1406) from the user of the VoIP device 106.

The customer service representative or the web page then communicates the user-provided geographic address(es) to the web server 122 (FIG. 1) (block 1408), and the web server communicates the user-provided geographic address(es) to the LAM database 154 (block 1410). After the subscriber access interface 1104 or the service provider access interface 1106 (FIG. 11) of the LAM database 154 receive the geographic address(es) from the web server 122, the LAM database 154 stores the geographic address(es) in data records (block 1412) of, for example, the data structure 1000 (FIG. 10). The validator 1108 of the LAM database 154 then determines whether the geographic address(es) are MSAG-valid (block 1414) by, for example, comparing the address(es) to geographic address(es) in the MSAG database 158 (FIG. 1). The validator 1108 then sets the status validated flags of the geographic address(es) (block 1416) under the status validated column 1018 (FIG. 10) of the LAM database 154. For example, the validator 1108 can set a status validated flag to YES for each geographic address that is MSAG-valid and set a status validated flag to NO for each geographic address that is not MSAG-valid.

The LAM database 154 then commits the address updates (block 1418) and the LAM database 154 determines whether the user specified a current address (block 1420) by, for example, selecting one of the user-provided geographic addresses or another geographic address in the LAM database 154 as a current address. If the LAM database 154 determines that the user specified a current address (block 1420), the LAM database 154 sets the current address in the data structure 1000 (FIG. 10) (block 1422). For example, the LAM database 154 can set the current address for the VoIP device 106 by setting the flag value to YES in the current address column 1014 for the data record corresponding to the selected current geographic address and the subscriber account for the VoIP device 106. The LAM database 154 also sets the flag value of a previous current address to NO.

When the current address update interface 1112 (FIG. 11) of the LAM database 154 detects that the current address has changed, the current address update interface 1112 triggers a current address update in the LIS database 142 (block 1424). In this manner, the LIS database 142 is updated to store a current geographic address associated with the VoIP device 106 for use with, for example, E911 emergency services.

After the current address update interface 1112 of the LAM database 154 triggers the current address update in the LIS database 142 (block 1424), or if the user did not specify a current address (block 1420), the device configuration interface 1110 updates the geographic address list 902a (FIG. 9) in the NMS 114 (block 1426). For example, the device configuration interface 1110 can search the data structure 1000 for data records associated with the subscriber account ID corresponding to the VoIP device 106, compile the geographic address entries from those data records into the geographic address list 902a, and communicate the geographic address list 902a to the NMS 114.

The NMS 114 then notifies the VoIP device 106 to update the geographic address list 902b (FIG. 9) locally stored in the VoIP device 106 (block 1428). The update interface 912 of the VoIP device 106 then receives the updated geographic address information (e.g., additions, deletions, changes, etc.) from the NMS 114 and updates the locally stored geographic address list 902b (block 1430). The process of FIG. 14 then ends.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by different, faster, and/or more efficient systems having the same general purpose. Accordingly, replacement devices, standards and/or protocols having the same general functions which are equivalents which are intended to be included within the scope of the accompanying claims.

Further, although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method to update geographic location information comprising: storing first and second geographic location information in a first list of geographic location information associated with an internet protocol device to enable provisioning of location-based emergency services to the internet protocol device, the first list being stored at a service provider server, wherein the first geographic location information includes a first street address and the second geographic location information includes a second street address; and in response to the internet protocol device connecting to a network, communicating at least a partial copy of the first list from the service provider server to the internet protocol device for storing as a second list of geographic location information in the internet protocol device, the second list of geographic location information storing entries indicative of a plurality of different geographic locations associated with the internet protocol device.

2. A method as defined in claim 1, wherein the first and second geographic location information are respectively associated with first and second geographic locations in which the internet protocol device is operative.

3. A method as defined in claim 1, further comprising receiving the first geographic location information via at least one of a web-based interface or a customer agent interface.

4. A method as defined in claim 1, further comprising verifying that the first geographic location information is valid based on a master street address guide database.

5. A method as defined in claim 1, further comprising receiving a message from the internet protocol device associated with verifying that the second list of geographic location information includes the same geographic location information as the first list of geographic location information.

6. A method as defined in claim 1, further comprising receiving data from the internet protocol device indicative of a user selection of the first geographic location information or the second geographic location information.

7. A method as defined in claim 6, further comprising identifying the selected one of the first geographic location information or the second geographic location information as a current geographic location of the internet protocol device.

8. A method as defined in claim 7, further comprising registering the internet protocol device with the network to enable the internet protocol device to access network services via the network after identifying the current geographic location of the internet protocol device.

9. A method as defined in claim 6, wherein the data is received via a session initiation protocol registration header during a registration process.

10. An apparatus to update geographic location information associated with providing emergency services, the apparatus comprising: a memory configured to store first and second geographic location information in a first list of geographic location information associated with an internet protocol device to enable provisioning of location-based emergency services to the internet protocol device, the memory being located at a service provider server, wherein the first geographic location information includes a first street address and the second geographic location information includes a second street address; and a device configuration interface configured to, in response to a geographic address update in the memory, communicate at least a partial copy of the first list from the service provider server to the internet protocol device for storing as a second list of geographic location information in the internet protocol device, the second list of geographic location information storing a plurality of entries indicative of a plurality of different geographic locations.

11. An apparatus as defined in claim 10, wherein the first and second geographic location information are respectively associated with first and second geographic locations in which the internet protocol device is operative.

12. An apparatus as defined in claim 10, further comprising at least one of a subscriber access interface or a service provider access interface configured to receive the first geographic location information for storing in the memory.

13. An apparatus as defined in claim 10, further comprising a validator configured to verify that the first geographic location information is valid based on a master street address guide database.

14. An apparatus as defined in claim 10, further comprising a current address update interface configured to communicate a geographic address specified as a current address associated with the internet protocol device from the memory to a location information server database for use in connection with E911 emergency services.

15. An apparatus as defined in claim 10, further comprising at least one of a subscriber access interface, a service provider access interface, or a device registrar interface configured to receive data indicative of a user selection of the first geographic location information or the second geographic location information as a current geographic address indicative of a location in which the internet protocol device is located.

16. A machine accessible storage device comprising instructions that, when executed, cause a machine to perform a method comprising: storing first and second geographic location information in a first list of geographic location information associated with an internet protocol device to enable provisioning of location-based emergency services to the internet protocol device, the first list being stored at a service provider server, wherein the first geographic location information includes a first street address and the second geographic location information includes a second street address; and communicating at least a partial copy of the first list from the service provider server to the internet protocol device for storing as a second list of geographic location information in the internet protocol device, the second list of geographic location information storing a plurality of entries indicative of a plurality of different geographic locations.

17. A machine accessible medium as defined in claim 16, wherein the method further comprises receiving a message from the internet protocol device associated with verifying that the second list of geographic location information includes the same geographic location information as the first list of geographic location information.

18. A machine accessible medium as defined in claim 16, wherein the method further comprises receiving data from the internet protocol device indicative of a user selection of the first geographic location information or the second geographic location information.

19. A machine accessible medium as defined in claim 17, wherein the method further comprises identifying the selected one of the first geographic location information or the second geographic location information as a current geographic location of the internet protocol device.

20. A machine accessible medium as defined in claim 19, wherein the method further comprises registering the internet protocol device with a network to enable the internet protocol device to access network services via the network after identifying the current geographic location of the internet protocol device.

* * * * *